US011492484B2

(12) United States Patent
Young et al.

(10) Patent No.: US 11,492,484 B2
(45) Date of Patent: *Nov. 8, 2022

(54) POLYMER COMPOSITIONS HAVING IMPROVED PROPERTIES OF THERMAL STABILITY, COLOR, AND/OR FLOW

(71) Applicant: Eastman Chemical Company, Kingsport, TN (US)

(72) Inventors: Robert Erik Young, Kingsport, TN (US); Mark Allen Peters, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/631,873

(22) PCT Filed: Jul. 17, 2018

(86) PCT No.: PCT/US2018/042388
§ 371 (c)(1),
(2) Date: Jan. 17, 2020

(87) PCT Pub. No.: WO2019/018340
PCT Pub. Date: Jan. 24, 2019

(65) Prior Publication Data
US 2020/0157342 A1    May 21, 2020

Related U.S. Application Data

(60) Provisional application No. 62/534,965, filed on Jul. 20, 2017.

(51) Int. Cl.
*C08L 67/02* (2006.01)

(52) U.S. Cl.
CPC ......... *C08L 67/025* (2013.01); *C08L 2201/08* (2013.01)

(58) Field of Classification Search
CPC .... C08L 67/02; C08L 67/025; C08L 2201/08; C08K 5/13; C08K 5/524
See application file for complete search history.

(56) References Cited

U.S. PATENT DOCUMENTS

| | | | |
|---|---|---|---|
| 2,012,267 A | 8/1935 | Carothers | |
| 4,524,165 A | 6/1985 | Musser et al. | |
| 4,885,119 A | 12/1989 | Mueller et al. | |
| 4,897,453 A | 1/1990 | Flora et al. | |
| 5,428,086 A | 6/1995 | Minnick et al. | |
| 5,654,347 A | 8/1997 | Khemani et al. | |
| 5,696,176 A | 12/1997 | Khemani et al. | |
| 2001/0044518 A1* | 11/2001 | Hoffmann | C08K 5/005 528/108 |
| 2004/0010092 A1 | 1/2004 | Watanabe | |
| 2005/0043483 A1 | 2/2005 | Kim et al. | |
| 2005/0124779 A1* | 6/2005 | Shelby | C08L 67/025 528/206 |
| 2007/0105993 A1 | 5/2007 | Germroth et al. | |
| 2007/0213458 A1 | 9/2007 | Topoulos | |
| 2009/0088504 A1 | 4/2009 | Chatterjee et al. | |
| 2009/0170985 A1 | 7/2009 | Ai et al. | |
| 2012/0083572 A1* | 4/2012 | Klots | C08F 212/08 524/576 |
| 2014/0128504 A1 | 5/2014 | Lu | |
| 2014/0167088 A1 | 6/2014 | Lu | |
| 2016/0130422 A1 | 5/2016 | Tamura et al. | |
| 2016/0137834 A1 | 5/2016 | Sohn et al. | |
| 2016/0264778 A1 | 9/2016 | Masunaga et al. | |

FOREIGN PATENT DOCUMENTS

| | | |
|---|---|---|
| CN | 105 524 399 A | 4/2016 |
| CN | 106 317 798 A | 1/2017 |
| CN | 107746554 A | 3/2018 |
| EP | 3009476 A1 | 4/2016 |
| WO | WO 2009/110230 A1 | 9/2009 |
| WO | WO 2009/120211 A1 | 10/2009 |

OTHER PUBLICATIONS

USPTO Office Action dated Nov. 17, 2021 received in co-pending U.S. Appl. No. 16/631,881.
ASTM D4440; "Standard Test Method for Plastics: Dynamic Mechanical Properties Melt Rheology"; Jan. 15, 2015.
ASTM D1003; "Standard Test Method for Haze and Luminous Transmittance of Transparent Plastics"; Published Jun. 2021.
ASTM D2244; "Standard Practice for Calculation of Color Tolerances and Color Differences from Instrumentally Measured Color Coordinates"; Published Jun. 2021.
ASTM D2457; "Standard Test Method for Specular Gloss of Plastic Films and Solid Plastics"; Published Jun. 2021.
ASTM D3418; "Standard Test Method for Transition Temperatures and Enthalpies of Fusion and Crystallization of Polymers by Differential Scanning Calorimetry"; May 1, 2015.
ASTM D3763; "Standard Test Method for High Speed Puncture Properties of Plastics Using Load and Displacement Sensors"; Published Nov. 2018.
ASTM D6290; "Standard Test Method for Color Determination of Plastic Pellets"; Jun. 1, 2019.

(Continued)

*Primary Examiner* — Robert S Jones, Jr.
(74) *Attorney, Agent, or Firm* — Robert C. Morriss

(57) ABSTRACT

This invention relates to a polymer composition comprising:
(A) at least one polymer comprising at least one diol residue, and
(B) a stabilizer composition comprising:
(1) at least one primary antioxidant comprising at least one phenolic antioxidant; and
(2) at least one secondary antioxidant comprising at least one phosphite, and
(3) at least one chain extending agent;
wherein the b* value for said polymer composition is less than 10 according to the L*, a* and b* color system of the CIE (International Commission on Illumination) after being heated for at least three hours at 200° C. or 24 hours at 175° C.

20 Claims, 8 Drawing Sheets

(56) References Cited

OTHER PUBLICATIONS

ASTMD6395; "Standard Test Method for Flatwise Flexural Impact Resistance of Rigid Plastics"; Published Apr. 2011.
ASTM E308; "Standard Practice for Computing the Colors of Objects by Using the CIE System"; Jun. 1, 2018.
ASTMG155; "Standard Practice for Operating Xenon Arc Light Apparatus for Exposure of Non Metallic Materials"; Published Aug. 2013.
Elias, Hans-Georg; Macromolecules 1, Plenum Press: NY, 1977, p. 391.
Co-pending U.S. Appl. No. 16/631,881, filed Jan. 17, 2020; Young et al.
Co-pending U.S. Appl. No. 17/310,055, filed Jul. 14, 2021; Young et al.
Notification of Transmittal of the International Search Report and the Written Opinion of the International Searching Authority, or the Declaration; International Application No. PCT/US2018/042388 with a filing date of Jul. 17, 2018.
Notification of Transmittal of the International Search Report and the Written Opinion of the International Searching Authority, or the Declaration; International Application No. PCT/US2018/042395 with a filing date of Jul. 17, 2018.
Notification of Transmittal of the International Search Report and the Written Opinion of the International Searching Authority, or the Declaration dated Apr. 22, 2020 for International Application No. PCT/US2020/013468.

\* cited by examiner

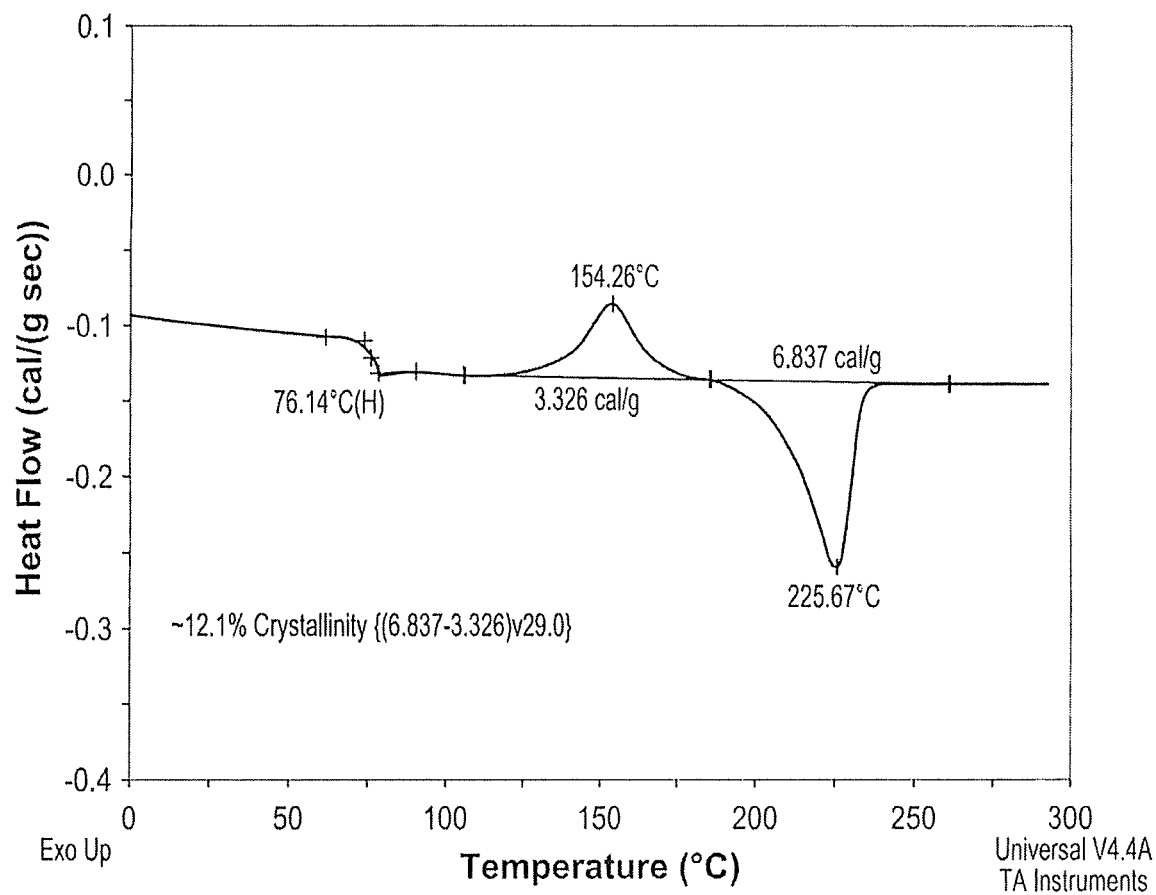
FIG 1: Example for determining degree of crystallinity
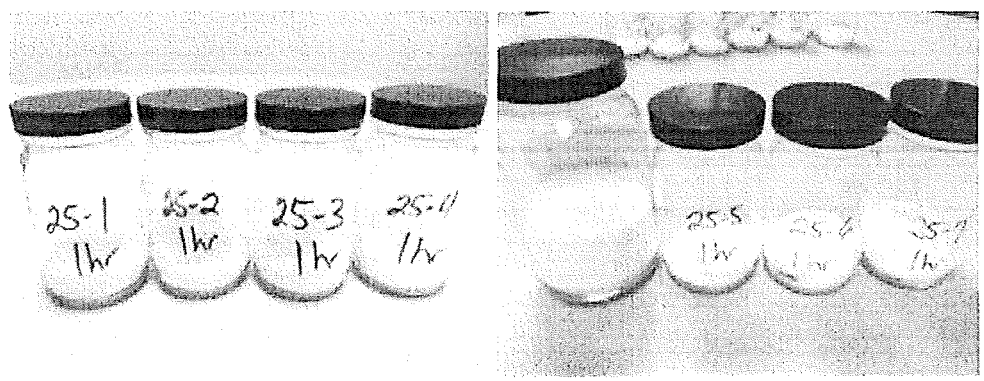
FIG 2: Polyester 1 Experiments - 1 Hour Oven Aging at 170°C

FIG 3: Polyester 1 Experiments - 2 Hours Oven Aging at 170°C
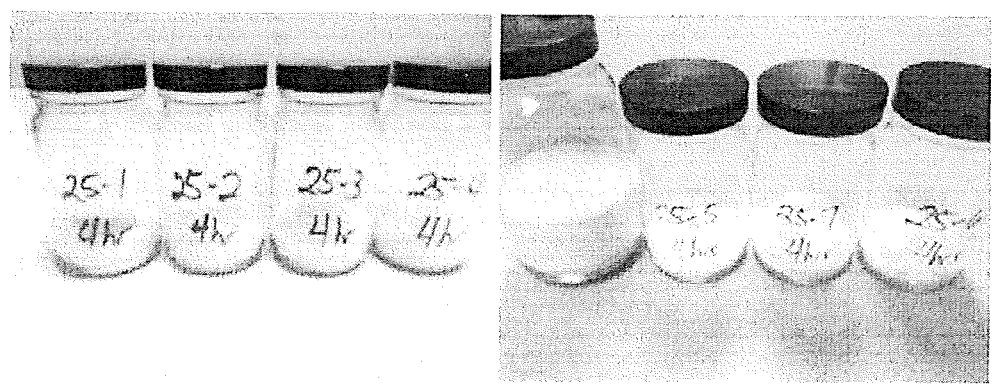
FIG 4: Polyester 1 Experiments - 4 Hours Oven Aging at 170°C

FIG 5: Polyester 1 Experiments - 8 Hours Oven Aging at 170°C
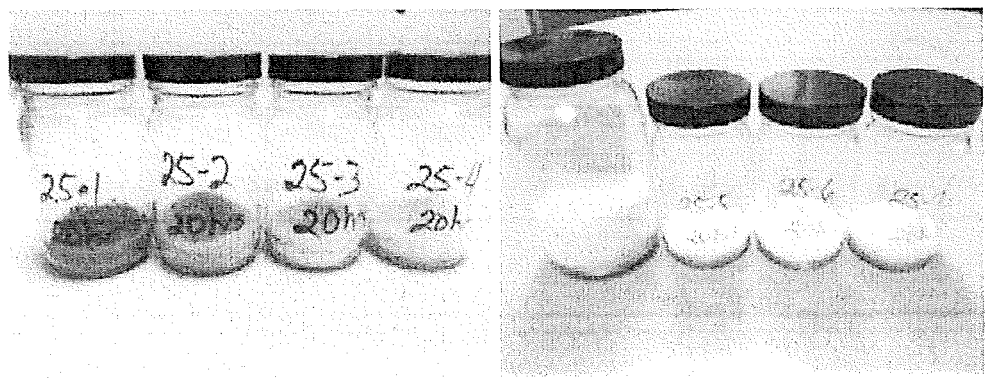
FIG 6: Polyester 1 Experiments - 20 Hours Oven Aging at 170°C

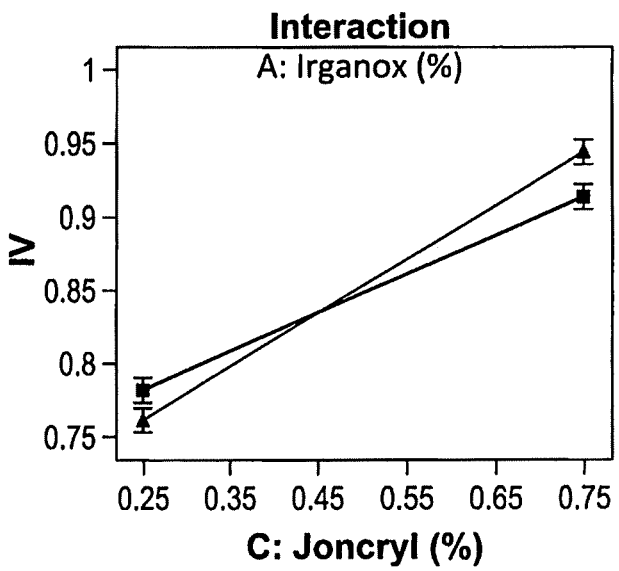
FIG 7: Effect of additives on IV for Polyester 2
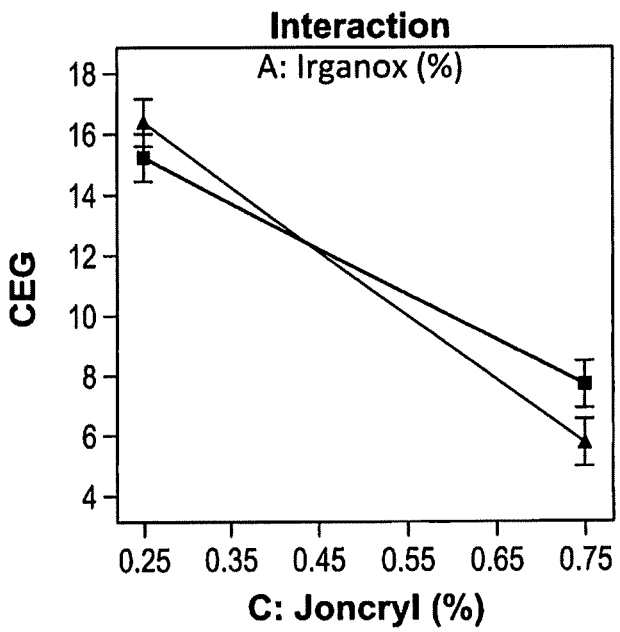
FIG 8: Effect of additives on CEG for Polyester 2

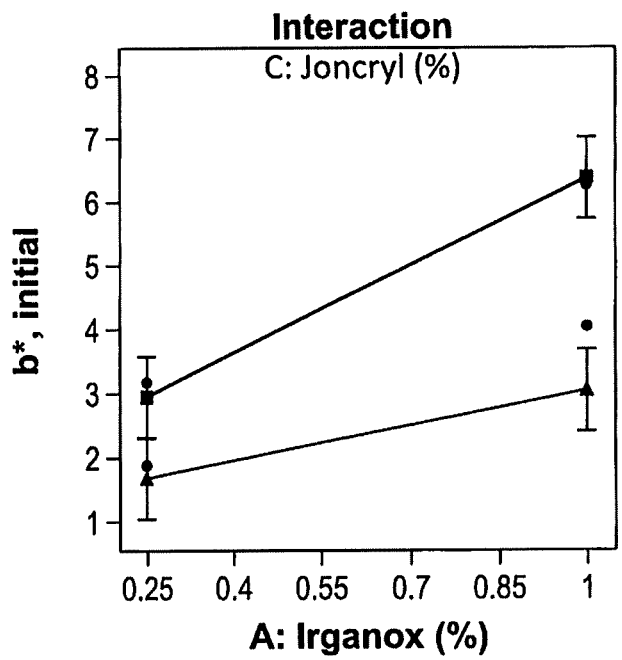
FIG 9: Effect of additives on Initial b* for Polyester 2
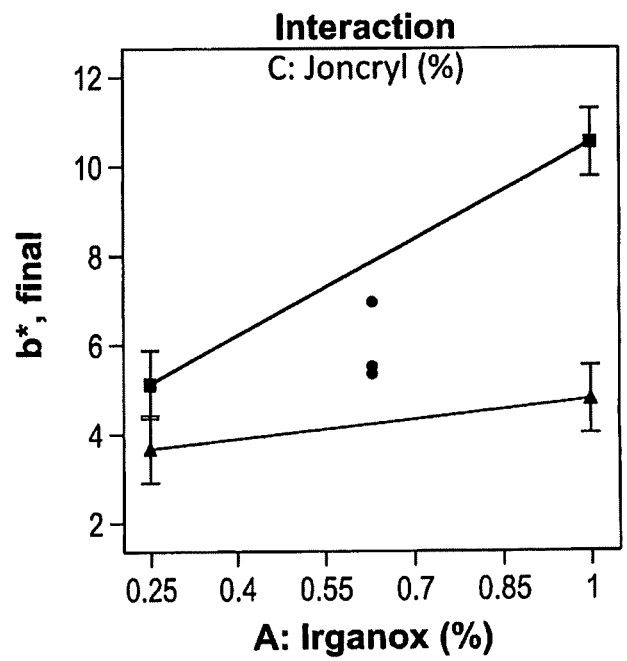
FIG 10: Effect of additives on aged/final b* for Polyester 2

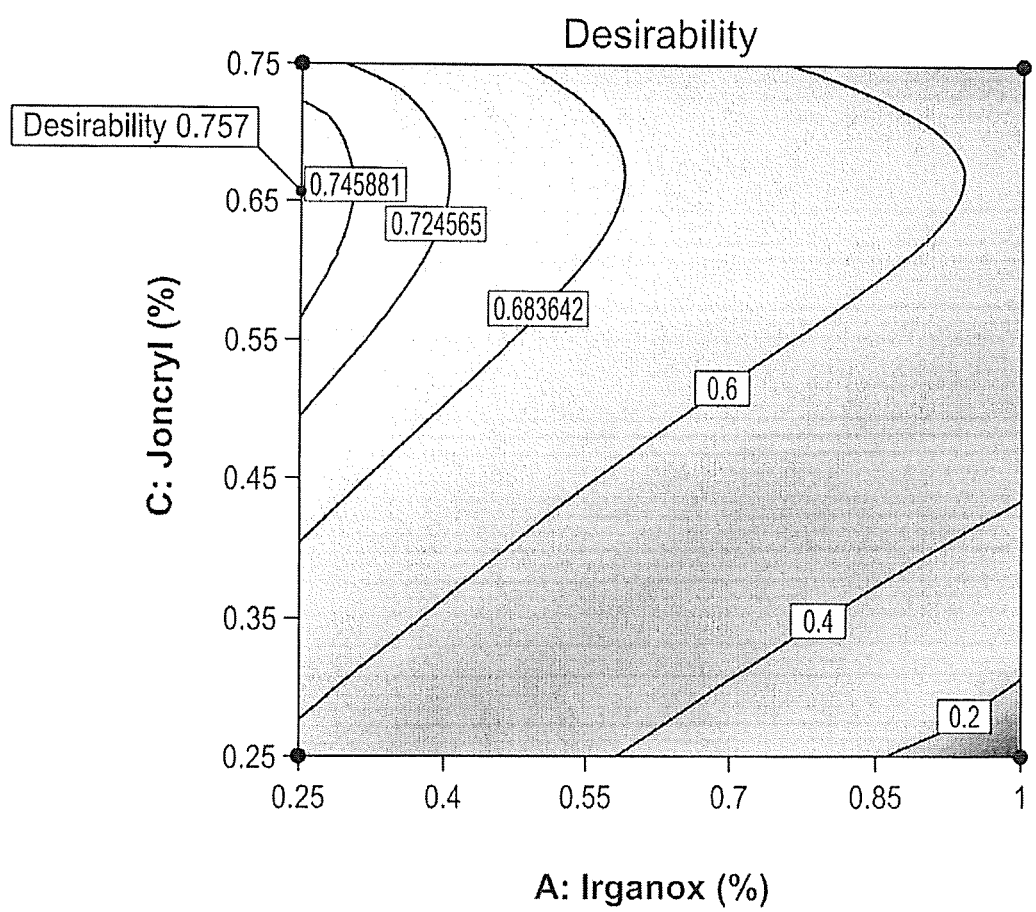
FIG 11: Desirability plot for targets of stable IV, low CEG, low initial b* (with Irgafos 168 concentration of 0.5%)

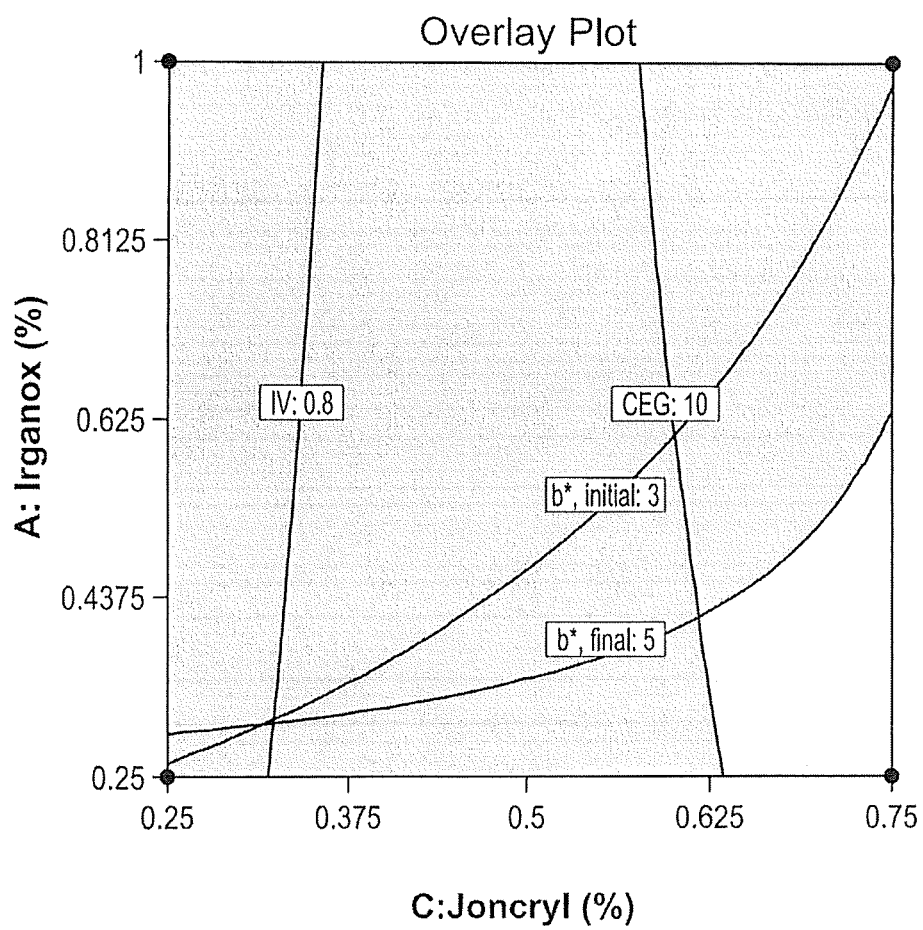
FIG 12: Contour Overlay Plot of optimum compositions with Irgafos 168 concentration of 0.25%

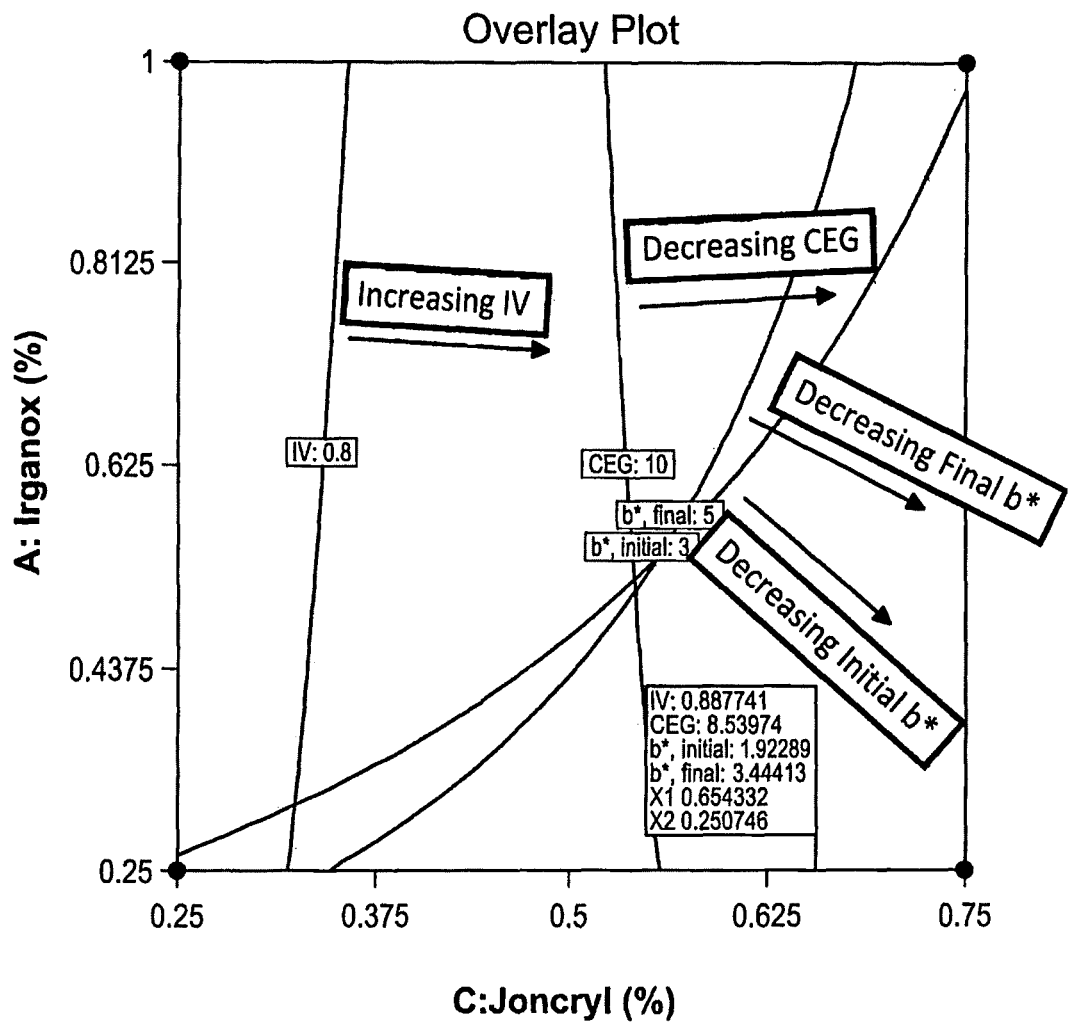
FIG 13: Contour Overlay Plot of optimum compositions with Irgafos 168 concentration of 0.5%

POLYMER COMPOSITIONS HAVING IMPROVED PROPERTIES OF THERMAL STABILITY, COLOR, AND/OR FLOW

CROSS-REFERENCE TO RELATED APPLICATION(S)

This application is a national stage filing under 35 USC §371 of PCT/US2018/042388, filed on Jul. 17, 2018, which claims the benefit of the filing date to U. S. Provisional Application Number 62/534,965, filed on Jul. 20, 2017, the entire disclosures of which are incorporated by reference herein.

FIELD OF THE INVENTION

This invention relates to combinations of additives to improve thermal oxidative stability, color properties, and/or flow of condensation polymers.

BACKGROUND OF THE INVENTION

Polyesters and other polymeric materials degrade during processing and usage due to exposures such as heat, processing time, storage time, ultraviolet light, or other potential conditions.

There are two main types of antioxidants, referred to as primary and secondary, and defined by their mode of operation. Primary antioxidants are free radical scavengers that generally terminate free radical chain propagation by donating a hydrogen atom. In one embodiment, primary antioxidants can include hindered phenols and secondary aromatic amines. Secondary antioxidants are hydroperoxide radical decomposers that operate by decomposing the radical into stable non-reactive products and are typically divalent sulfur or trivalent phosphorous.

Combinations of primary antioxidants and secondary antioxidants have been previously used to improve stability of thermoplastic materials during processing and throughout their service life. However, even with the use of these additives, there is room for improvement in the stability of these materials during processing and service life.

In fact, there is a need in the art for polymeric material that has improved oxidative stability, improved hydrolytic stability and/or improved viscosity, as well as other improved properties, for use in various applications, e.g., after being heated at elevated temperatures and/or for time periods greater than typically needed for standard molding and extrusion processes. Examples of these applications are 3D printing and Light Emitting Diodes (LED).

SUMMARY OF THE INVENTION

In one aspect of the invention, the polymer compositions of the invention demonstrate improved properties, including but not limited to: improved thermal oxidative stability, improved hydrolytic stability, lower zero shear viscosity, molecular weight stability, inherent viscosity stability, improved color stability, melt viscosity stability, lower number of carboxyl end groups, and/or combinations of two or more these properties.

These benefits can be useful in various applications, e.g., processes requiring elevated temperatures. In one aspect, combinations of a primary antioxidant, a secondary antioxidant, and a chain extending additive unpredictably inhibit the thermal oxidative degradation while simultaneously greatly improving the color stability of polymers held below their melting point and maximum processing temperature.

In one aspect, there is provided a polymer composition comprising:
 (A) at least one thermoplastic polymer, and
 (B) a stabilizer composition comprising:
  (1) at least one primary antioxidant;
  (2) at least one secondary antioxidant; and
  (3) at least one chain extending agent.

In one aspect, there is provided a polymer composition comprising:
 (A) at least one condensation polymer, and
 (B) a stabilizer composition comprising:
  (1) at least one phenolic antioxidant;
  (2) at least one phosphite; and
  (3) at least one chain extending agent.

In one aspect, there is provided a polymer composition comprising:
 (A) at least one polymer selected from liquid crystalline polyesters/amides/imides, polyesteramides, polyimides, polyetherimides, polyurethanes, polyureas, polybenzimidazole, polybenzoxazoles, polyimines, polycarbonates, polyesters, copolyesters, and polyamides; and
 (B) a stabilizer composition comprising:
  (1) at least one primary antioxidant;
  (2) at least one secondary antioxidant; and
  (3) at least one chain extending agent.

In one aspect, there is provided a polymer composition comprising:
 (A) at least one polymer selected from thermoplastic polymers, condensation polymers, polyesters, amorphous polyesters, semi-crystalline polyesters, polyamides, or any of the foregoing polymers, comprising residues of cyclohexanedimethanol (e.g., 1,4-cyclohexanedimethanol); and
 (B) a stabilizer composition comprising:
  (1) at least one primary antioxidant;
  (2) at least one secondary antioxidant; and
  (3) at least one chain extending agent.

In one aspect, there is provided a polymer composition comprising:
 (A) at least one polyester, and
 (B) a stabilizer composition comprising:
  (1) at least one primary antioxidant;
  (2) at least one secondary antioxidant; and
  (3) at least one chain extending agent.

In one aspect, there is provided a polymer composition comprising:
 (A) at least one polymer selected from polyesters (including but not limited to polyesterethers), polyamides, and comprising or not comprising residues of cyclohexanedimethanol (e.g., 1,4-cyclohexanedimethanol); and
 (B) a stabilizer composition comprising:
  (1) at least one hindered phenolic antioxidant;
  (2) at least one phosphite antioxidant; and
  (3) at least one chain extending agent comprising at least one copolymer of glycidyl methacrylate and styrene.

In one aspect, there is provided a polymer composition comprising:
 (A) at least one polyester comprising cyclohexanedimethanol, e.g. 1,4-cyclohexanedimethanol, and
 (B) a stabilizer composition comprising:
  (1) at least one primary antioxidant;
  (2) at least one secondary antioxidant; and
  (3) at least one chain extending agent.

In one aspect, there is provided a polymer composition comprising:
(A) at least one polyester comprising cyclohexanedimethanol, e.g. 1,4-cyclohexanedimethanol, and
(B) a stabilizer composition comprising:
  (1) at least one phenolic antioxidant; and
  (2) at least one phosphite; and
  (3) at least one chain extending agent.

In one aspect, there is provided a polymer composition comprising:
(A) at least one polymer selected from thermoplastic polymers, condensation polymers, polyesters, amorphous polyesters, semi-crystalline polyesters, crystalline polyesters, polyamides, or any of the foregoing polymers, comprising residues of cyclohexanedimethanol (e.g., 1,4-cyclohexanedimethanol); and
(B) a stabilizer composition comprising:
  (1) at least one phenolic antioxidant;
  (2) at least one phosphite; and
  (3) at least one multifunctional epoxy containing chain extending agent comprising, for example, from at least 2 or at least 3 or at least 4 or at least 5 functional epoxy groups, etc., or from 2 to 18 functional epoxy groups, or from 2 to 10 functional epoxy groups or from 3 to 8 functional epoxy groups.

In one aspect, there is provided a polymer composition comprising:
(A) at least one polymer selected from liquid crystalline polyesters/amides/imides, polyesteramides, polyimides, polyetherimides, polyurethanes, polyureas, polybenzimidazole, polybenzoxazoles, polyimines, polycarbonates, polyesters, copolyesters, and polyamides;
(B) a stabilizer composition comprising:
  (1) at least one phenolic antioxidant;
  (2) at least one phosphite; and
  (3) at least one multifunctional epoxy containing chain extending agent comprising, for example, from at least 2 or at least 3 or at least 4 or at least 5 functional epoxy groups, etc., or from 2 to 18 functional epoxy groups, or from 2 to 10 functional epoxy groups or from 3 to 8 functional epoxy groups.

In one aspect, there is provided a polymer composition comprising:
(A) at least one polyester comprising residues of 1,4-cyclohexanedimethanol, and
(B) a stabilizer composition comprising:
  (1) at least one phenolic antioxidant;
  (2) at least one phosphite; and
  (3) at least one multifunctional epoxy containing chain extending agent, for example, 2-20 functional epoxy groups or 3-15 functional groups or 3-8 functional groups.

In one aspect, there is provided a polymer composition comprising:
(A) at least one polyester, and
(B) a stabilizer composition comprising:
  (1) at least one phenolic antioxidant;
  (2) at least one phosphite; and
  (3) at least one copolymer of glycidyl methacrylate with styrene.

In one aspect, there is provided a polymer composition comprising:
(A) at least one polyester comprising residues of 1,4-cyclohexanedimethanol, and
(B) a stabilizer composition comprising:
  (1) at least one phenolic antioxidant;
  (2) at least one phosphite; and
  (3) at least one copolymer of glycidyl methacrylate with styrene.

In one aspect, there is provided a polymer composition comprising:
(A) at least one polymer selected from polyesters (including but not limited to polyesterethers), optionally comprising residues of cyclohexanedimethanol (e.g., 1,4-cyclohexanedimethanol) and from polyamides;
(B) a stabilizer composition comprising:
  (1) at least hindered phenolic antioxidant;
  (2) at least one phosphite antioxidant; and
  (3) at least one chain extending agent comprising at least one copolymer of glycidyl methacrylate with styrene.

In one embodiment, the invention relates to a method for stabilizing any of the thermoplastic polymers useful in the invention against surface oxidative degradation, comprising: incorporating into the polymer an effective stabilizing amount of the stabilizer composition of the invention.

For certain aspects of the invention, the polymer composition can have improved properties, for example, for color stability, thermal oxidative stability, melt viscosity stability, inherent viscosity stability, zero shear viscosity, and/or melt stability as can be expressed in number of carboxyl end groups.

In certain aspects, the improvements observed were unpredictable and greater than would be expected from the sum of the individual effects of each additive on the polymer and/or greater than what would be expected from other combinations of additives, such as combinations of primary antioxidants and secondary antioxidants without the chain extending agents.

DESCRIPTION OF THE FIGURES

FIG. 1: The graph in FIG. 1 shows melt flow as a function of temperature for a PCTA polymer used for calculation of the degree of crystallization for that polymer.

FIG. 2-FIG. 6: FIGS. 2 to 6 show the effect of oven aging samples at 170 C up to 20 hours without any anti-oxidants (Example 25-1), with only a conventional antioxidant combination (Runs 25-2, -3 and -4) and with the tricombination of antioxidant additives (Runs 25-5, -6, and -7).

FIG. 7: The plot in FIG. 7 shows the effect on inherent viscosity at different levels of primary antioxidant (Irganox™1010 antioxidant), secondary antioxidant (Irgafos™ 168 antioxidant) and chain extending agent (Joncryl™4468 additive) for Polyester 2.

FIG. 8: The plot in FIG. 8 shows the effect on carboxyl end groups (CEG) at different levels of primary antioxidant (Irganox™1010 antioxidant), secondary antioxidant (Irgafos™ 168 antioxidant) and chain extending agent (Joncryl™4468 additive) for Polyester 2.

FIG. 9: The plot in FIG. 9 shows the effect on initial b*color at different levels of primary antioxidant (Irganox™1010 antioxidant), secondary antioxidant (Irgafos™168 antioxidant) and chain extending agent (Joncryl™4468 additive) for Polyester 2.

FIG. 10: The plot in FIG. 10 shows the effect on aged/final b*color at different levels of primary antioxidant (Irganox™1010 antioxidant), secondary antioxidant (Irgafos™ 168 antioxidant) and chain extending agent (Joncryl™4468 additive) for Polyester 2.

FIG. 11: Desirability plot for targets of stable IV, low CEG, low initial b*, and low final b* (with Irgafos™168 concentration of 0.5%).

FIG. 12: Contour Overlay Plot of optimum compositions with Irgafos™168 concentration of 0.25%.

FIG. 13: Contour Overlay Plot of optimum compositions with Irgafos™168 concentration of 0.5%.

DETAILED DESCRIPTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

The present invention involves the use of primary antioxidants, secondary antioxidants and chain extending additives which can inhibit the thermal oxidative and hydrolytic degradation of polymers, optionally held at elevated temperatures for extended periods of time and can improve polymer flow.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons," is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used in the specification and the claims, the singular forms "a," "an" and "the" include their plural references unless the context clearly dictates otherwise. References to a composition or process containing or including "an" ingredient or "a" step is intended to include other ingredients or other steps, respectively, in addition to the one named.

The terms "containing" or "including," are synonymous with the term "comprising," and is intended to mean that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

In each embodiment of the invention, the polymers useful in the invention can comprise condensation polymers. Condensation polymers useful in the invention can include but are not limited to, at least one of liquid crystalline polyesters/amides/imides, polyesteramides, polyimides, polyetherimides, polyurethanes, polyureas, polybenzimidazole, polybenzoxazoles, polyimines, polycarbonate, polyesters, copolyesters, polyamides (e.g., Nylon 6,6 or Nylon 6), or mixtures thereof. All of these polymers can be susceptible to thermal oxidative and hydrolytic degradation. Polycaprolactone, polycaprolactam, while not typically synthesized using condensation polymerization, are also susceptible to hydrolytic degradation and are included within the scope of this invention. Polyphenylene sulfide, polyphenylene oxide, poly ether ether ketone, poly ether ketone, poly ether ketone ketone, while not condensation polymers in the traditional sense, are highly susceptible to cross-linking and branching during melt processing and they are limited by thermal stability during processing and end use applications in the oil and gas industries and are included within the scope of this invention. The polymers useful in the polymer composition of the invention can be thermoplastic.

In one embodiment, the polymer composition useful in the invention comprises at least one polyester. In embodiments, polyesters useful in the present invention can comprise residues of at least one aromatic diacid and residues of at least one glycol. The term "copolyester," as used herein, is intended to include "polyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically, the difunctional carboxylic acid can be a dicarboxylic acid and the difunctional hydroxyl compound can be a dihydric alcohol such as, for example, glycols. Furthermore, as used in this application, the interchangeable terms "diacid" or "dicarboxylic acid" include multifunctional acids, such as branching agents. The term "glycol" as used in this application includes, but is not limited to, diols, glycols, and/or multifunctional hydroxyl compounds. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue," as used herein, means any organic structure incorporated into a polymer through a polycondensation and/or an esterification reaction from the corresponding monomer. The term "repeating unit," as used herein, means an organic structure having a dicarboxylic acid residue and a diol residue bonded through an ester group. Thus, for example, the dicarboxylic acid residues may be derived from a dicarboxylic acid monomer or its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester. The term "modifying aromatic diacid" means an aromatic dicarboxylic acid other the terephthalic acid. The term "modifying glycol" means a glycol other than 1,4-cyclohexanedimethanol. In one embodiment, terephthalic acid may be used as the starting material. In another embodiment, dimethyl terephthalate may be used as the starting material. In another embodiment, mixtures of terephthalic acid and dimethyl terephthalate may be used as the starting material and/or as an intermediate material. For the purposes of this invention, polyesterethers are included within the definition of polyesters within the scope of this invention.

The polyesters and copolyesters of the present invention are readily prepared by methods well known in the art, for example, as described in U.S. Pat. No. 2,012,267, incorporated herein by reference in its entirety. More particularly, the reactions for preparing the copolyesters are usually carried out at temperatures of about 150° C. to about 300° C. in the presence of polycondensation catalysts such as titanium tetrachloride, manganese diacetate, antimony oxide, dibutyl tin diacetate, zinc chloride, or combinations thereof. The catalysts are typically employed in amounts of 10 to 1000 ppm, based on total weight of the reactants.

In one embodiment, the polymer composition useful in the invention can contain at least one polymer comprising cyclohexanedimethanol, e.g. 1,4-cyclohexanedimethanol. In one embodiment, the polymer composition useful in the invention can contain at least one polymer comprising ethylene glycol.

Condensation polymers are also susceptible to hydrolytic degradation if not pre-dried or if they are held at elevated temperatures in moist air for a long period of time. Condensation polymers are any polymers where monomers reacting during polycondensation to create a polymer and a by-product such as water or methanol is produced. The polymerization reaction is reversible; thus, condensation polymers are often pre-dried before processing.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 70 mole % terephthalic acid, based on the total acid residues, means the polyester contains 70 mole % terephthalic acid residues out of a total of 100 mole % acid residues. Thus, there are 70 moles of terephthalic acid residues among every 100 moles of acid residues. In another example, a polyester containing 30 mole % 1,4-cyclohexanedimethanol residues, based on the total diol residues, means the polyester contains 30 mole % 1,4-cyclohexanedimethanol residues out of a total of 100 mole % diol residues. Thus, there are 30 moles of 1,4-cyclohexanedimethanol residues among every 100 moles of diol residues.

In one embodiment, the polyester or copolyesters comprise compositions with a single diacid or combinations of diacids such as terephthalic acid or phthalic acid or other diacids with 8 to 20 carbon atoms, with combinations of modifying glycols such as cyclohexanedimethanol or ethylene glycol or other glycols with 2 to 20 carbon atoms.

In certain embodiments, the condensation polymer comprises at least one diol residue. In certain embodiments, the condensation polymer is a polyester comprising at least one dicarboxylic acid or an ester thereof and at least one diol, wherein the total of acid residues present is 100 mole % and wherein the total of diol residues is 100 mole %. In certain embodiments, the condensation polymer, e.g., polyester, comprises 1,4-cyclohexanedimethanol residues.

In certain embodiments, terephthalic acid, or an ester thereof, such as, for example, dimethyl terephthalate, or a mixture of terephthalic acid and an ester thereof, makes up most or all of the dicarboxylic acid component used to form the polyesters useful in the invention. In certain embodiments, terephthalic acid residues can make up a portion or all of the dicarboxylic acid component used to form the present polyester at a concentration of at least 70 mole %, such as at least 80 mole %, at least 90 mole %, at least 95 mole %, at least 99 mole %, or 100 mole %. In certain embodiments, polyesters with high amounts of terephthalic acid can be used in order to produce higher impact strength properties. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acids and/or dimethyl terephthalate residues, the dicarboxylic acid component of the polyesters useful in the invention can comprise up to 50 mole %, up to 40 mole %, up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, from 0.01 to 20 mole %, from 0.01 to 10 mole %, from 0.01 to 5 mole %, or from 0.01 to 1 mole % of one or more modifying aromatic dicarboxylic acids. In one embodiment, modifying aromatic dicarboxylic acids that may be used in the present invention include, but are not limited to, those having up to 20 carbon atoms. Examples of modifying aromatic dicarboxylic acids which may be used in this invention include, but are not limited to, isophthalic acid, 4,4-biphenyldicarboxylic acid, 1,4-, 1,5-, 2,6-, 2,7-naphthalenedicarboxylic acid, and trans-4,4-stilbenedicarboxylic acid, and esters thereof. In one embodiment, isophthalic acid is the modifying aromatic dicarboxylic acid. In one embodiment, dimethyl isophthalate is used. In one embodiment, dimethyl naphthalate is used.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids or their corresponding esters including but not limited to dimethyl adipate, dimethyl glutarate and dimethyl succinate. Certain embodiments can also comprise 0.01 or more mole %, such as 0.1 or more mole %, 1 or more mole %, 5 or more mole %, or 10 or more mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

In one embodiment, only esters of terephthalic acid and esters of the other modifying dicarboxylic acids may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, and phenyl esters.

In one embodiment of the invention, the polyesters useful in the invention can contain less than 30 mole % of one or more modifying glycols. In another embodiment, the polyesters useful in the invention can contain 20 mole % or less of one or more modifying glycols. In another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention may contain 0 mole % modifying glycols. Certain embodiments can also contain 0.01 or more mole %, such as 0.1 or more mole %, 1 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the polyesters useful in the invention can contain 2 to 16 carbon atoms. For TMCD-CHDM copolyesters (polymers comprising 2,2,4,4-tetramethyl-1,3-cyclobutanediol, 1,4-cyclohexanedimethanol, and terephthalic acid residues), a modifying glycol can be residues of ethylene glycol. Examples of other suitable modifying glycols useful in the polyesters described herein include, but are not limited glycols selected from ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1, 3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and mixtures thereof.

In one TMCD copolyester embodiment, ethylene glycol is excluded as a modifying diol. For modified PETG and modified PCTG polymers, the modifying glycol can be a glycol other than ethylene glycol and 1,4-cyclohexanedimethanol, for example.

Other modifying glycols can include polymeric diols (also known as polyols) such as: Polyethylene glycol, polypropylene glycol, PTMG (also called PTMEG or polyTHF), polyester polyol, polycarbonate polyol, and polycaprolactone polyol. A polyol is an organic compound containing multiple hydroxyl groups. A molecule with more than two hydroxyl groups is a polyol, with three is a triol, one with with four is a tetrol and so on. By convention, polyols do not refer to compounds that contain other functional groups. Polyols typically have weight average molecular weights (Mw) of about 500 to 5000 with Mw's of about around 1000 to 2000 prefered. In embodiments, hydroxyl functionalities, meaning the number of hydroxyl groups as polymer end groups, can range from about 1.9 to about 2.1 for thermoplastic materials and from about 2.1 and higher for cross-linked materials.

The polyesters useful in the polyester compositions and/or the polyesterethers of the invention can comprise from 0 to 10 mole % of at least one branching agent, for example, 0.01 to 5 mole % or 0.01 to 4 mole % or from 0.01 to 3 mole % or from 0.01 to 2 mole % or from 0.01 to about 1.5 mole % or from 0.01 to 1 mole % or from 0.1 to 5 mole % or 0.1 to 4 mole % or from 0.1 to 3 mole % or from 0.1 to 2 mole % or from 0.1 to about 1.5 mole % or from 0.1 to 1 mole or from 0.5 to 5 mole % or 0.5 to 4 mole % or from 0.5 to 3 mole % or from 0.5 to 2 mole % or from 0.5 to about 1.5 mole % or from 0.5 to 1 mole % or from 1 to 5 mole % or 1 to 4 mole % or from 1 to 3 mole % or from 1 to 2 mole % or from 0.1 to 0.7 mole %, or 0.1 to 0.5 mole %, based the total mole percentages of either the diol or diacid residues, based on at total of 100 mole % diols and 100 mole % diacids; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, trimethylolethane, glycerol, pentaerythritol, citric acid, tartaric acid, 3-hydroxyglutaric acid, pentaerythritol, sorbitol, 1,2,6-hexanetriol, glycerine tetra-maleaic anhydride, and trimesic acid, and the like or mixtures thereof.

In one embodiment, at least one of trimellitic acid, trimellitic anhydride, trimesic acid, pentaerythritol, glycerine, tetra-maleaic anhydride, and trimer acid can be used as the branching agent. The branching monomer may be added to the polyester reaction mixture or blended with the polyester in the form of a concentrate as described, for example, in U.S. Pat. Nos. 5,654,347 and 5,696,176.

The polymers and/or polyesters useful in the invention can comprise residues of 1,4-cyclohexanedimethanol in any amount, included but not limited to at least one of the following amounts: from 0.01 to 100 mole %; from 0.01 to 100 mole %; from 0.01 to 99.99 mole %; from 0.10 to 99 mole %; from 0.10 to 99 mole %; from 0.10 to 95 mole %; from 0.10 to 90 mole %; from 0.10 to 85 mole %; from 0.10 to 80 mole %; from 0.10 to 70 mole %; from 0.10 to 60 mole %; from 0.10 to 50 mole %; from 0.10 to 40 mole %; from 0.10 to 35 mole %; from 0.10 to 30 mole %; from 0.10 to 25 mole %; from 0.10 to 20 mole %; from 0.10 to 15 mole %; from 0.10 to 10 mole %; from 0.10 to 5 mole %; from 1 to 100 mole %; from 1 to 99 mole %; 1 to 95 mole %; from 1 to 90 mole %; from 1 to 85 mole %; from 1 to 80 mole %; from 1 to 70 mole %; from 1 to 60 mole %; from 1 to 50 mole %; from 1 to 40 mole %; from 1 to 35 mole %; from 1 to 30 mole %; from 1 to 25 mole %; from 1 to 20 mole %; from 1 to 15 mole %; from 1 to 10 mole %; from 1 to 5 mole %; 5 to 100 mole %; 5 to 99 mole %; 5 to 95 mole %; from 5 to 90 mole %; from 5 to 85 mole %; from 5 to 80 mole %; 5 to 70 mole %; from 5 to 60 mole %; from 5 to 50 mole %;

from 5 to 40 mole %; from 5 to 35 mole %; from 5 to 30 mole %; from 5 to 25 mole %; from 5 to 20 mole %; and from 5 to 15 mole %; from 5 to 10 mole %; from 10 to 100 mole %; from 10 to 99 mole %; 10 to 95 mole %; from 10 to 90 mole %; from 10 to 85 mole %; from 10 to 80 mole %; from 10 to 70 mole %; from 10 to 60 mole %; from 10 to 50 mole %; from 10 to 40 mole %; from 10 to 35 mole %; from 10 to 30 mole %; from 10 to 25 mole %; from 10 to 20 mole %; from 10 to 15 mole %; from 20 to 100 mole %; from 20 to 99 mole %; 20 to 95 mole %; from 20 to 90 mole %; from 20 to 85 mole %; from 20 to 80 mole %; from 20 to 70 mole %; from 20 to 60 mole %; from 20 to 50 mole %; from 20 to 40 mole %; from 20 to 35 mole %; from 20 to 30 mole %; and from 20 to 25 mole %; 30 to 100 mole %; from 30 to 99 mole %; 30 to 95 mole %; from 30 to 90 mole %; from 30 to 85 mole %; from 30 to 80 mole %; from 30 to 70 mole %; from 30 to 60 mole %; from 30 to 50 mole %; from 30 to 40 mole %; from 30 to 35 mole %; 40 to 100 mole %; from 40 to 99 mole %; 40 to 95 mole %; from 40 to 90 mole %; from 40 to 85 mole %; from 40 to 80 mole %; from 40 to 70 mole %; from 40 to 60 mole %; from 40 to 50 mole %; 50 to 100 mole %; from 50 to 99 mole %; 50 to 95 mole %; from 50 to 90 mole %; from 50 to 85 mole %; from 50 to 80 mole %; from 50 to 70 mole %; from 50 to 60 mole %; 60 to 100 mole %; from 60 to 99 mole %; 60 to 95 mole %; from 60 to 90 mole %; from 60 to 85 mole %; from 60 to 80 mole %; from 60 to 70 mole %; 70 to 100 mole %; from 70 to 99 mole %; 70 to 95 mole %; from 70 to 90 mole %; from 70 to 85 mole %; from 70 to 80 mole %; from 60 to 70 mole %; 80 to 100 mole %; from 80 to 99 mole %; 80 to 95 mole %; from 80 to 90 mole %; 90 to 100 mole %; from 90 to 99 mole %; 90 to 95 mole %; 95 to 100 mole %; or from 95 to 99 mole %.

The polyesters may be prepared by any method known to one of ordinary skill in the art.

The polymer composition useful in the invention can any of the traditional compositions described as polyethylene terephthalate (PET), acid-modified polyethylene terephthalate (PETA), glycol modified PET (PETG), glycol modified poly(cyclohexylene dimethylene terephthalate) (PCTG), poly(cyclohexylene dimethylene terephthalate) (PCT), acid modified poly(cyclohexylene dimethylene terephthalate) (PCTA), and any of the foregoing polymers modified with 2,2,4,4-tetramethylcyclobutane-1,3-diol (TMCD polyesters).

In one aspect, the polyester useful in the polymer compositions of the invention comprises residues of isosorbide. In one embodiment, the isosorbide polymer can also comprise residues of ethylene glycol and/or cyclohexanedimethanol. In embodiments, the polyester comprises residues of isosorbide and 1,4-cyclohexanedimethanol and optionally, ethylene glycol. In embodiments, the polyester comprises residues of isosorbide and ethylene glycol and optionally, 1,4-cycloehxanedimethanol.

For terephthalate based polyesters, terephthalic acid can be present in an amount of from 70 to 100 mole %. Modifying dicarboxylic acids may be present in an amount of up to 30 mole %. In one embodiment, the modifying dicarboxylic acid can be isophthalic acid. Aliphatic diacids can also be present in the terephthalic acid based polyesters of the invention.

In certain embodiments, the polymer compositions of the invention can include copolyesters comprising residues of 70 to 100 mole % terephthalic acid, and optionally, 0.01 to 30 mole %, or 0.01 to 20 mole %, or 0.01 to 10 mole %, or 0.01 to 5 mole % of isophthalic acid, or esters there and/or mixtures thereof.

In certain embodiments, the polymer compositions of the invention can include copolyesters comprising 1,4-cyclohexanedimethanol and, optionally, ethylene glycol. In certain embodiments, the polymer compositions of the invention can include copolyesters comprising from 50 mole % to 100 mole %, or from 60 mole % to 100 mole %, or from 65 mole % to 100 mole %, or from 70 mole % to 100 mole %, or from 75 mole % to 100 mole %, or from 80 mole % to 100 mole %, or from 90 mole % from to 100 mole %, or 95 mole % to 100 mole %, of residues of 1,4-cyclohexanedimethanol and, optionally, from 0 mole % to 50 mole %, or from 0 mole % to 40 mole %, or from 0 mole % to 35 mole %, or from 0 mole % to 30 mole %, or from 0 mole % to 25 mole %, or from 0 mole % to 20 mole %, or from 0 mole % to 10 mole %, or from 0 mole % to 5 mole %, of residues of ethylene glycol.

In certain embodiments, the polymer compositions of the invention can include copolyesters comprising residues of 99 to 100 mole % terephthalic acid and residues of 99 to 100 mole % 1,4-cyclohexanedimethanol. In certain embodiments, the polyester comprises residues of diethylene glycol. In embodiments, the polyester comprises residues of terephthalic acid, isophthalic acid and 1,4-cyclohexanedimethanol. In embodiments, the polyester comprises from 50 mole % to 99.99 mole % of residues of 1,4-cyclohexanedimethanol, 0.01 mole % to 50 mole % of residues of ethylene glycol, and from 70 mole % to 100 mole % of residues of terephthalic acid. In embodiments, the polyester comprises from 80 mole % to 99.99 mole % of residues of 1,4-cyclohexanedimethanol and 0.01 mole % to 20 mole % of residues of ethylene glycol. In embodiments, the polyester comprises from 90 mole % to 99.99 mole % of residues of 1,4-cyclohexanedimethanol and 0.01 mole % to 10 mole % of residues of ethylene glycol. In embodiments, the polyester comprises from 95 mole % to 99.99 mole % of residues of 1,4-cyclohexanedimethanol and 0.01 mole % to 5 mole % of residues of ethylene glycol. In embodiments, the polyester comprises from 95 mole % to 99.99 mole % of residues of 1,4-cyclohexanedimethanol, 0.01 mole % to 10 mole % of residues of ethylene glycol, from 90 mole % to 100 mole % of residues of terephthalic acid, and 0.01 to 10 mole % of residues of isophthalic acid. In embodiments, the polyester comprises from 95 mole % to 100 mole % of residues of 1,4-cyclohexanedimethanol, 0.01 mole % to 5 mole % of residues of ethylene glycol, from 95 mole % to 100 mole % of residues of terephthalic acid, and 0.01 to 5 mole % of residues of isophthalic acid. In embodiments, the polyester consists essentially of residues of terephthalic acid or an ester thereof and 1,4-cyclohexanedimethanol. In embodiments, the polyester comprising consist essentially of residues of terephthalic acid or an ester thereof, 1,4-cyclohexanedimethanol and ethylene glycol. In embodiments, the polyester comprises 0 mole % to 30 mole % or 0 mole % to 20 mole % or 0 mole % to 10 mole % or 0 mole % to 5 mole % or 0.01 mole % to 30 mole % or 0.01 mole % to 20 mole % or 0.01 mole % to 10 mole % or 0.01 mole % to 5 mole % isophthalic acid residues, based on a total of 100 mole % acid residues and a total of 100 mole % of diol residues. In embodiments, the polyester comprises from 20 mole % to less than 50 mole % of residues of 1,4-cyclohexanedimethanol, greater than 50 mole % to 80 mole % of residues of ethylene glycol, and from 70 mole % to 100 mole % of residues of terephthalic acid. In embodiments, the polyester comprises from 20 mole % to 40 mole % of residues of 1,4-cyclohexanedimethanol, 60 mole % to 80 mole % of residues of ethylene glycol, and from 70 mole % to 100 mole % of residues of terephthalic acid. In embodiments, the polyester comprises from 25 mole % to 40 mole % of residues of 1,4-cyclohexanedimethanol, 60 mole % to 75 mole % of residues of ethylene glycol, and from 70 mole % to 100 mole % of residues of terephthalic acid. In embodiments, the polyester comprises from 25 mole % to 35 mole % of residues of 1,4-cyclohexanedimethanol, 65 mole % to 75 mole % of residues of ethylene glycol, and from 70 mole % to 100 mole % of residues of terephthalic acid. In embodiments, the polyester comprises 0 to 20 mole % of residues of 1,4-cyclohexanedimethanol and 80 to 100 of residues of ethylene glycol.

In certain embodiments, the polyester comprises residues of neopentyl glycol. In embodiments, the polyester comprises 2,2,4-cyclobutanediol-1,3-cyclobutanediol residues.

In embodiments, the polyester comprises from 0.01 to 99 mole % 2,2,4,4-tetramethyl-1,3-cyclobutanediol residues and from 0.01 to 99 mole % 1,4-cyclohexanedimethanol residues and 70 to 100 mole % terephthalic acid residues. In embodiments, the polyester comprises from 20 to 40 mole % 2,2,4,4-tetramethyl-1,3-cyclobutanediol residues, from 20 to 40 mole % 1,4-cyclohexanedimethanol residues, 20 to 60 mole % of ethylene glycol residues. In embodiments, the polyester comprises from 0.01 to 15 mole % 2,2,4,4-tetramethyl-1,3-cyclobutanediol residues. In embodiments, the polyester comprises from 15 to 40 mole % 2,2,4,4-tetramethyl-1,3-cyclobutanediol residues and from 60 to 85 mole % 1,4-cyclohexanedimethanol residues. In embodiments, the polyester comprises from 20 to 40 mole % 2,2,4,4-tetramethyl-1,3-cyclobutanediol residues and from 60 to 80 mole % 1,4-cyclohexanedimethanol residues. In embodiments, the polyester comprises from 20 to 30 mole % 2,2,4,4-tetramethyl-1,3-cyclobutanediol residues and from 70 to 80 mole % 1,4-cyclohexanedimethanol residues and 70 to 100 mole % terephthalic acid residues. In embodiments, the polyester comprises from 30 to 40 mole % 2,2,4,4-tetramethyl-1,3-cyclobutanediol residues and from 60 to 70 mole % 1,4-cyclohexanedimethanol residues and 70 to 100 mole % terephthalic acid residues.

In embodiments, the polyester component comprises residues of 1,4-cyclohexanedicarboxylic acid or an ester thereof. In embodiments, the polyester component comprises residues of dimethyl-1,4-cyclohexanedicarboxylate. In embodiments, the polyester component comprises residues 1,4-cyclohexanedicarboxylic acid or an ester thereof in the amount of from 70 to 100 mole % or from 80 to 100 mole % or from 90 to 100 mole % or from 95 to 100 mole % or from 98 to 100 mole %, based on a total of 100 mole % acid residues and a total of 100 mole % diol residues.

In some aspects of the invention, the copolyesters useful in the invention may comprise a diacid component comprising at least 70 mole % of residues of terephthalic acid, isophthalic acid, or mixtures thereof; and a diol component comprising (a) the residues of 2,2,4,4-tetramethyl-1,3-cyclobutanediol and residues of 1,4-cyclohexanedimethanol (TMCD Copolyesters).

In one embodiment, the polyester can comprise from 0.01 to 99.99 mole % 2,2,4,4-tetramethyl-1,3-cyclobutanediol residues and 99.99 to 0.01 mole % 1,4-cyclohexanedimethanol residues, or from 20 to 50 mole % 2,2,4,4-tetramethyl-1,3-cyclobutanediol residues and 50 to 80 mole % 1,4-cyclohexanedimethanol residues, or from 20 to less than 50 mole % 2,2,4,4-tetramethyl-1,3-cyclobutanediol residues and greater than 50 to 80 mole % 1,4-cyclohexanedimethanol residues, or from 15 to 40 mole % 2,2,4,4-tetramethyl-1,3-cyclobutanediol residues and 60 to 85 mole % 1,4-cyclohexanedimethanol residues, or from 20 to 40 mole % 2,2,4,4-tetramethyl-1,3-cyclobutanediol residues and 60 to 80 mole % 1,4-cyclohexanedimethanol residues, or from 20 to 30 mole % 2,2,4,4-tetramethyl-1,3-cyclobutanediol residues and 70 to 80 mole % 1,4-cyclohexanedimethanol residues, or from 30 to 40 mole % 2,2,4,4-tetramethyl-1,3-cyclobutanediol residues and 60 to 70 mole % 1,4-cyclohexanedimethanol residues, or from 0.01 to 15 mole % 2,2,4,4-tetramethyl-1,3-cyclobutanediol residues and 85 to 99.99 mole % 1,4-cyclohexanedimethanol residues, or from 20 to 40 mole % 2,2,4,4-tetramethyl-1,3-cyclobutanediol residues, from 20 to 40 mole % 1,4-cyclohexanedimethanol residues and 20 to 60 mole % of ethylene glycol residues, and, for all of these ranges, optionally, 70 to 100 mole % terephthalic acid or isophthalic residues or mixtures thereof, based on a total of 100 mole % acid residues and a total of 100 mole % diol residues.

In one embodiment, the polyester can comprise 20 to 40 mole % 2,2,4,4-tetramethyl-1,3-cyclobutanediol residues and 60 to 80 mole % 1,4-cyclohexanedimethanol residues and 70 to 100 mole % terephthalic acid residues, based on a total of 100 mole % acid residues and a total of 100 mole % diol residues.

In certain embodiments, the polymer compositions of the invention may can include copolyesters comprising, optionally, 0.01 to 30 mole %, or 0.01 to 20 mole %, or 0.01 to 10 mole %, or 0.01 to 5 mole % of terephalic acid and/or isophthalic acid, or esters there and/or mixtures thereof; and a diol component comprising: (a) from 20 to less than 50 mole % of 1,4-cyclohexanedimethanol and residues from greater than 50 to 80 mole % ethylene glycol residues; or from 20 to 40 mole % of 1,4-cyclohexanedimethanol residues and from 60 to 80 mole % ethylene glycol residues, or from 20 to 40 mole % of 1,4-cyclohexanedimethanol residues and from 60 to 80 mole % ethylene glycol residues, or from 25 to 40 mole % of 1,4-cyclohexanedimethanol residues and from 60 to 75 mole % ethylene glycol residues, or from 25 to 35 mole % of 1,4-cyclohexanedimethanol residues and from 65 to 75 mole % ethylene glycol residues (PETG); or (b) from 50 mole % to 99.99 mole %, or from 55 mole % to 99.99 mole %, or from 60 mole % to 99.99 mole %, or from 65 mole % to 99.99 mole %, or from 70 mole % to 99.99 mole %, or from 75 mole % to 99.99 mole %, or from 80 mole % to 99.99 mole %, or from 85 mole % to 99.99 mole % percent, or from 90 mole % from to 99.99 mole %, or 95 mole % to 99.99 mole %, of residues of 1,4-cyclohexanedimethanol and from 0.01 mole % to 50 mole %, or from 0.01 mole % to 45 mole %, or from 0.01 mole % to 40 mole %, or from 0.01 mole % to 35 mole %, or from 0.01 mole % to 30 mole %, or from 0.01 mole % to 25 mole %, or from 0.01 mole % to 20 mole %, or from 0.01 mole % to 15 mole %, or from 0.01 mole % to 10 mole %, or from 0.01 mole % to 5 mole %, of residues of ethylene glycol (PCTG); or (c) from 95 to 99.99 mole %, of residues of 1,4-cyclohexanedimethanol and from 0.01 to 10 mole % or from 0.01 to 5 mole % of residues of isophthalic acid, and from 0.01 to 10 mole % or from 0.01 to 5 mole % of residues of ethylene glycol (PCTA) or (d) 0 to 20 mole % of residues of 1,4-cyclohexanedimethanol and 80 to 100 mole % of residues of ethylene glycol (PET or glycol modified PET) or (e) isosorbide polymers comprising 1,4-cyclohexanedimethanol and optionally, ethylene glycol or (f) isosorbide polymers comprising ethylene glycol or (g) (PCT as defined herein). In certain embodiments, the diol component can comprise from 10 mole % to 40 mole %, or from 15 mole % to 35 mole %, or from 20 mole % to 35 mole %, or from 20 mole % to 30 mole %, or from 20 mole % to 40 mole %, or from 20 mole % to 35 mole %, of residues of isosorbide;

from 30 mole % to 70 mole %, or from 40 mole % to 70 mole %, or from 45 mole % to 65 mole %, or from 45 mole % to 60 mole %, or from 45 mole % to 55 mole %, or from 47 mole % to 65 mole %, or from 48 mole % from to 65 mole %, or 49 mole % to 65 mole %, or 50 mole % to 65 mole %, or from 47 mole % to 60 mole %, or from 48 mole % from to 60 mole %, or 49 mole % to 60 mole %, or 50 mole % to 60 mole %, of residues of 1,4-cyclohexanedimethanol and, optionally, from 0 mole % to 40 mole %, or from 0 mole % to 35 mole %, or from 0 mole % to 30 mole %, or from 0 mole % to 25 mole %, or from 0 mole % to 20 mole %, or from 0 mole % to 15 mole %, or from 0 mole % to 10 mole %, or from 0 mole % to 5 mole %, of residues of ethylene glycol. In one embodiment, the diol component can comprise from 18 mole % to 35 mole %, or from 20 mole % to 35 mole %, of residues of isosorbide; from 40 mole % to 58 mole %, or from 45 mole % to 55 mole %, of residues of 1,4-cyclohexanedimethanol; and, from 15 mole % to 25 mole %, or from 20 mole % to 25 mole %, of residues of ethylene glycol.

In one embodiment, the polyesters useful in polymer compositions of the invention can also comprise copolyester ethers (COPE), e.g., (PCCE) commercially available, for example, from Eastman Chemical Company. The term "polyesters" as used herein, is intended to include copolyesterethers.

The COPE polymer has high melt strength, thus allowing articles to be blow molded from the molten polymer. Other desirable properties which make the COPE polymer especially useful in the manufacture of products such as medical supplies include its high level of clarity and low odor. Furthermore, the COPE polymer has a fast crystallization rate, allowing reasonably fast rates of production for molded articles such as bags, bottles or cast film.

The copolyesterethers according to this invention are derived from a dicarboxylic acid component comprising and/or consisting essentially of 1,4-cyclohexanedicarboxylic acid or an ester forming derivative thereof such as dimethyl-1,4-cyclohexanedicarboxylate. This acid and ester are both sometimes referred to herein as DMCD. The diol component consists essentially of 1,4-cyclohexanedimethanol (CHDM) and polytetramethylene ether glycol (PTMG). The copolyesterethers further can comprise branching agents, for example, from about 0.1 to about 1.5 mole %, based on the acid or glycol component, of a polyfunctional branching agent having at least 3 carboxyl or hydroxyl groups.

In embodiments, the dibasic acid component of the copolyesterether comprises residues of 1,4-cyclohexanedicarboxylic acid or dimethyl-1,4-cyclohexanedicarboxylate having a trans isomer content of at least 70% or at least 80% or at least 85%. In an embodiment, the dibasic acid component of the copolyesterether of this invention consists essentially of DMCD and can have a trans isomer content of at least 70%, or at least 80% or at least 85%.

The polyesterether useful in the polymer compositions of the invention wherein the polyester component comprises residues 1,4-cyclohexanedicarboxylic acid or an ester thereof in the amount of from 70-100 weight % or from 80 to 100 weight % or from 90 to 100 mole % or from 95 to 100 mole % or from 98 to 100 mole %, based on a total of 100 mole % acid residues and a total of 100 mole % diol residues. The polyesterether can comprise residues of 1,4-cyclohexanedimethanol and polytetramethylene ether glycol.

The polyesterether can comprise residues of from 15 mole % to 50 mole % or from 20 weight % to 50 weight % or from 25 to 50 weight % or from 30 to 50 weight % or from 35 to 50 weight % or from 40 to 50 weight % or from 45 to 50 weight % or from 15 weight % to 45 weight % or from 20 weight % to 45 weight % or from 25 to 45 weight % or from 30 to 45 weight % or from 35 to 45 weight % or from 40 to 45 weight % or from 15 weight % to 40 weight % or from 20 weight % to 40 weight % or from 25 to 40 weight % or from 30 to 40 weight % or from 35 to 40 weight % or from 15 weight % to 35 weight % or from 20 weight % to 35 weight % or from 25 to 35 weight % or from 15 weight % to 30 weight % or from 20 weight % to 30 weight % or from 25 to 30 weight % or from 15 weight % to 25 weight % of polytetramethylene ether glycol residues.

In one embodiment, the polyesterether can comprise residues of from 20 weight % to 50 weight %, or from 25 weight % to 45 weight %, or from 30 to 40 weight % of polytetramethylene ether glycol residues.

In one embodiment, the polyester portion of the polyesterether comprises residues of at least one glycol as described for the polyesters useful in the invention. In certain embodiments, the polyester portion of the polyesterether comprises residues of at least one glycol selected from ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and mixtures thereof.

The polyesterether can comprise residues of from 15 weight % to 50 weight %, or from 15 weight % to 45 weight %, or from 15 weight % to 40 weight %, or from 15 weight % to 35 weight %, or from 15 weight % to 30 weight %, or from 20 weight % to 50 weight %, or from 20 weight % to 45 weight % of 1,4-cyclohexanedimethanol residues.

In one embodiment, useful copolyesterethers can have an inherent viscosity of from about 0.70 to about 1.5 dig as determined in 60/40 (wt/wt) phenol/tetrachloroethane at a concentration of 0.5 g/100 ml at 25° C. comprising A. a dicarboxylic acid component comprising and/or consisting essentially of 1,4-cyclohexanedicarboxylic acid, and B. a glycol component consisting essentially of
(1) 1,4-cyclohexanedimethanol,
(2) from about 15 to about 50 weight percent, or from 20 to 35 weight percent, based on the weight of the polyesterether, of polytetramethyleneether glycol having a weight average molecular weight of about 500 to about 2000.

In one embodiment, useful copolyesterethers can have an inherent viscosity of from about 0.70 to about 1.5 dig as determined in 60/40 (wt/wt) phenol/tetrachloroethane at a concentration of 0.5 g/100 ml at 25° C. comprising A. a dicarboxylic acid component comprising and/or consisting essentially of 1,4-cyclohexanedicarboxylic acid, B. a glycol component consisting essentially of
(1) 1,4-cyclohexanedimethanol,
(2) from about 15 to about 50 weight percent, or from 20 to 35 weight percent, based on the weight of the polyesterether, of polytetramethyleneether glycol having a weight average molecular weight of about 500 to about 2000, (3) from about 0.1 to about 1.5 mole %, or 0.1 to 1.0 mole % based on the total mole % of the acid or glycol component, of a branching agent having at least three COOH or OH functional groups and from 3 to 60 carbon atoms.

DMCD and CHDM are well known in the art and commercially available. "Man-Made Fibers: Science and Technology," Vol. III, edited by Mark, Atlas and Cernia, published by Interscience Publishers describes preparation of DMCD and CHDM at page 85.

The PTMG component of the copolyesterethers useful in this invention is commercially available, and is prepared by well known techniques. The PTMG used in the copolyesterether of this invention has a molecular weight of between about 500 and about 1100, or about 1000. It is used in an amount of from about 15 to about 50%, or from about 20-35%, based on the total weight of the copolyesterether. It is interesting to note that if the molecular weight of the PTMG approaches 2000, the surface of film produced therefrom shows a white deposit.

The copolyesterether of this invention further can comprise the same mole percentages of residues of at least one branching agent as described for the other polyesters useful in the invention. In one embodiment, the branching agent can be present in an amount from about 0.1 to about 1.5 mole %, based on the acid or glycol component, of a polybasic acid or polyhydric alcohol branching agent having at least three COOH or OH functional groups and from 3 to 60 carbon atoms. Esters of many such acids or polyols may also be used.

It should be understood that the total acid reactants for the polyesterether useful in the invention should be 100 mole %, and the total glycol reactants should be 100 mole %. If the branching agent used is a polybasic acid or anhydride, it will be calculated as part of the 100 mole % acid. Likewise, if the branching agent is a polyol, it will be calculated as part of the 100 mole % glycol. In some embodiments, the components of the COPE are specified in weight percentages herein, based on the total weight of the polyesterether equaling 100 weight %.

In other embodiments, the polyesterether may contain from about 0.1 to about 1.5 mole %, or 0.1 to 1.0 mole %, based on the total mole % of the acid or glycol component, of a branching agent having at least three COOH or OH functional groups and from 3 to 60 carbon atoms as well.

In one embodiment, the copolyesterether has an I.V. of about 0.7 to about 1.5 dL/g as determined in. 60/40 (wt/wt) phenol/tetrachloroethane at a concentration of 0.5 g/100 ml at 25° C.

The polytetramethyleneether glycol component of the copolyesterether is commercially available, and can be prepared by any technique known in the art. In one embodiment, the polytetramethylene ether glycol can have a molecular weight of between about 500 to about 2000, or about 800 to 2000, or about 500 to about 1200, or about 500 to about 1100, or about 800 to about 1200.

The copolyesterether further can optionally comprise up to about 1.5 mole % based on the acid or glycol component, of a polybasic or polyhydric alcohol branching agent having at least three COOH or OH functional groups and from 3 to 60 carbon atoms. Esters of many such acids or polyols may also be used. In one embodiment of the invention, the copolyesterethers of the invention do not include poly(arylene ethers). In another embodiment of the invention, blends of poly(arylene ethers) with other polymers are not included within the scope of the invention.

In one embodiment, at least one branching agent useful in the COPE or in the other polymers of the invention can be trimellitic acid or trimellitic anhydride or combinations thereof. Although the acid reactant is said to "consist essentially of" 1,4-cyclohexanedicarboxylic acid, if the branching agent is a polybasic acid or anhydride, it will be calculated as part of the 100 mole % acid. Likewise, the glycol component is said to "consist essentially of: 1,4-cyclohexanedimethanol and polytetramethylene ether glycol, if the branching agent is a polyol, it will be calculated as part of the 100 mole % glycol.

In embodiments of the invention, the condensation polymer, polyester or polyester portion of the polyesterether comprises residues of a branching agent. In embodiments, the polyester or the polyester component of said polyesterether comprises 0.01 to 5 mole % or 0.01 to 4 mole % or from 0.01 to 3 mole % or from 0.01 to 2 mole % or from 0.01 to about 1.5 mole % or from 0.01 to 1 mole % or from 0.1 to 5 mole % or 0.1 to 4 mole % or from 0.1 to 3 mole % or from 0.1 to 2 mole % or from 0.1 to about 1.5 mole % or from 0.1 to 1 mole or from 0.5 to 5 mole % or 0.5 to 4 mole % or from 0.5 to 3 mole % or from 0.5 to 2 mole % or from 0.5 to about 1.5 mole % or from 0.5 to 1 mole % or from 1 to 5 mole % or 1 to 4 mole % or from 1 to 3 mole % or from 1 to 2 mole % of at least one branching agent or at least one polyfunctional branching agent, based on a total of 100 mole % acid residues and a total of 100 mole % diol residues. In embodiments, the polyfunctional branching agent has at least 3 carboxyl or hydroxyl groups. In embodiments, the polyfunctional branching agent comprises residues of trimellitic acid, trimellitic anhydride, trimesic acid, trimethyol ethane, trimethyolpropane, pentaerythritol, glycerine, tetra-maleaic anhydride, and trimer acid. In embodiments, the polyfunctional branching agent comprises residues of trimellitic anhydride, trimethyolpropane, pentaerythritol, glycerine, tetra-maleaic anhydride.

In other aspects of the invention, the Tg of the polyesters or copolyesters useful in the invention can be, but is not limited to, at least one of the following ranges: −10 to 130° C.; −10 to 125° C.; −10 to 120° C.; −10 to 115° C.; −10 to 110° C.; −10 to 105° C.; −10 to 70° C.; −10 to 65° C.; −10 to 60° C.; −10 to 55° C.; −10 to 50° C.; −10 to 45° C.; −10 to 40° C.; −10 to 35° C.; −10 to 30° C.; −10 to 25° C.; −10 to 20° C.; −10 to 15° C.; −5 to 130° C.; −5 to 125° C.; −5 to 120° C.; −5 to 115° C.; −5 to 110° C.; −5 to 105° C.; −5 to 70° C.; −5 to 65° C.; −5 to 60° C.; −5 to 55° C.; −5 to 50° C.; −5 to 45° C.; −5 to 40° C.; −5 to 35° C.; −5 to 30° C.; −5 to 25° C.; −5 to 20° C.; −5 to 15° C.; 60 to 130° C.; 60 to 125° C.; 60 to 120° C.; 60 to 115° C.; 60 to 110° C.; 60 to 105° C.; 60 to 100° C.; 60 to 95° C.; 65 to 130° C.; 65 to 125° C.; 65 to 120° C.; 65 to 115° C.; 65 to 110° C.; 65 to 105° C.; 65 to 100° C.; 65 to 95° C.; 70 to 130° C.; 70 to 125° C.; 70 to 120° C.; 70 to 115° C.; 70 to 110° C.; 70 to 105° C.; 75 to 130° C.; 75 to 125° C.; 75 to 120° C.; 75 to 115° C.; 75 to 110° C.; 75 to 105° C.; 85 to 130° C.; 85 to 125° C.; 85 to 120° C.; 85 to 115° C.; 85 to 110° C.; 85 to 105° C.; 85 to 100° C.; 85 to 95° C.; 80 to 130° C.; 80 to 125° C.; 80 to 120° C.; 80 to 115° C.; 80 to 110° C.; 80 to 105° C.; 80 to 100° C.; 85 to 130° C.; 85 to 125° C.; 85 to 120° C.; 85 to 115° C.; 85 to 110° C.; 85 to 105° C.; 85 to 100° C.; 85 to 95° C.; 90 to 130° C.; 90 to 125° C.; 90 to 120° C.; 90 to 115° C.; 90 to 110° C.; 90 to 105° C.; 90 to 100° C.; 95 to 130° C.; 95 to 125° C.; 95 to 120° C.; 95 to 115° C.; 95 to 110° C.; 95 to 105° C.; 100 to 130° C.; 100 to 125° C.; 100 to 120° C.; 100 to 115° C.; 100 to 110° C.;

105 to 130° C.; 105 to 125° C.; 105 to 120° C.; 105 to 115° C.; 110 to 130° C.; 110 to 125° C.; 110 to 120° C.; 115 to 130° C.; 115 to 125° C.; 115 to 120° C.; 115 to 130° C.; 115 to 125° C.; 115 to 120° C.; and 120 to 130° C., as measured by ASTM Method 3418.

For certain embodiments of the invention, the condensation polymers, e.g., polyesters, useful in the invention may exhibit at least one of the following inherent viscosities as determined in 60/40 (wt/wt) phenol/tetrachloroethane at a concentration of 0.5 g/100 ml at 25° C.: one of the following ranges: 0.35 to 1.5 dUg; 0.35 to 1.2 dUg; 0.35 to 1 dUg; 0.50 to 1.5 dUg; 0.50 to 1.2 dUg; 0.50 to 1 dUg; 0.50 to 0.85 dUg; 0.50 to 80 dUg; 0.50 to 0.75 dUg; 0.50 to less than 0.75 dUg; 0.50 to 0.72 dUg; 0.50 to 0.70 dUg; 0.50 to less than 0.70 dUg; 0.50 to 0.68 dUg; 0.50 to less than 0.68 dUg; 0.50 to 0.65 dUg; 0.55 to 1.5 dUg; 0.55 to 1.2 dUg; 0.55 to 1 dUg; 0.55 to 0.85 dUg; 0.55 to 0.80 dUg; 0.55 to 0.78 dUg; 0.55 to 0.75 dUg; 0.55 to less than 0.75 dUg; 0.55 to 0.72 dUg; 0.55 to 0.70 dUg; 0.55 to less than 0.70 dUg; 0.55 to 0.68 dUg; 0.55 to less than 0.68 dUg; 0.55 to 0.65 dUg; 0.60 to 1.5 dUg; 0.60 to 1.2 dUg; 0.60 to 0.80 dUg; 0.60 to 0.75 dUg; 0.60 to 0.68 dUg; 0.70 to 1.5 dUg 0.70 to 1.2 dUg; 0.80 to 1.5 dUg; and 0.80 to 1.2 dUg.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.70 to 1.2 dUg; 0.70 to 1.1 dUg; 0.70 to 1 dUg; 0.70 to less than 1 dUg; 0.70 to 0.98 dUg; 0.70 to 0.90 dUg; 0.70 to 0.85 dUg; 0.70 to 0.80 dUg; 0.70 to 1.2 dUg; 0.70 to 1.1 dUg; 0.70 to 1 dUg; 0.70 to less than 1 dUg; 0.70 to 0.98 dUg; 0.70 to 0.90 dUg; 0.70 to 0.85 dUg; 0.70 to 0.80 dL/g; 0.75 to 1.2 dUg; 0.75 to 1.1 dUg; 0.75 to 1 dUg; 0.75 to 0.98 dUg; 0.75 to 0.90 dUg; 0.75 to 0.85 dUg; 0.80 to 1.2 dUg; 0.80 to 1.1 dUg; 0.80 to 1 dUg; 0.80 to less than 1 dUg; 0.80 to 0.98 dUg; 0.80 to 0.90 dUg; 0.70 to 0.80 dL/g; 0.90 to 1.2 dUg; 0.90 to 1.1 dUg; and 0.90 to 1 dUg.

It is contemplated that the polyester compositions of the invention can possess at least one of the inherent viscosity ranges described herein and at least one of the monomer ranges for the compositions described herein unless otherwise stated. It is also contemplated that the polyester compositions of the invention can possess at least one of the Tg ranges described herein and at least one of the monomer ranges for the compositions described herein unless otherwise stated. It is also contemplated that the polyester compositions of the invention can possess at least one of the Tg ranges described herein, at least one of the inherent viscosity ranges described herein and at least one of the monomer ranges for the compositions described herein unless otherwise stated.

In one embodiment, the present invention can employ a primary antioxidant of the hindered phenol type, a secondary antioxidant in the phosphite family and a chain extending agent with epoxide functionalities.

The primary antioxidants useful in this invention include a phenolic antioxidant.

Hindered phenols and hindered amines are the main types of primary antioxidants used in thermoplastics.

Several characteristics can be considered in the choice of a hindered phenolic antioxidant including the relative phenol content, which affects its reactivity, and the molecular weight sufficiently high to ensure that the antioxidant does not migrate easily out of the polymer.

In one embodiment, the phenolic antioxidant can be sterically hindered and/or relatively non-volatile. Examples of suitable phenolic antioxidants include hydroquinone, arylamine antioxidants such as 4,4'-bis($\alpha,\alpha$-dimethylbenzyl)diphenylamine, hindered phenol antioxidants such as 2,6-di-tert-butyl-4-methylphenol, butylated p-phenyl-phenol and 2-($\alpha$-methylcyclohexyl)-4,6-dimethylphenol; bisphenols such as 2,2'-methylenebis-(6-tert-butyl-4-methylphenol), 4,4'bis(2,6-di-tert-butylphenol), 4,4'-methylenebis(6-tert-butyl-2-methylphenol), 4,4'-butylenebis(6-tert-butyl-3-methylphenol), methylenebis(2,6ditertbutylphenol), 4,4'-thiobis(6-tert-butyl-2-methylphenol), and 2,2'-thiobis(4-methyl-6-tert-butylphenol); tris-phenols such as 1,3,5-tris(3,5-di-tert-butyl-4-hydroxyhydrocinnamoyl)-hexahydro-s-triazine, 1,3,5-trimethyl-2,4,6-tris(3, 5-di-tert-butyl-4-hydroxybenzyl)benzene and tri(3,5-di-tert-butyl-4-hydroxyphenyl)phosphite; and pentaerythritol tetrakis[3-(3,5-di-t-butyl-4-hydroxyphenyl)propionate] the last of which is commercially available as Irganox™ 1010 antioxidant.

In a further aspect, the antioxidant is a primary antioxidant, a secondary antioxidant, or combinations thereof. In a still further aspect, the primary antioxidant is selected from at least one hindered phenol, at least one secondary aryl amine, or a combination thereof.

In a further aspect, the at least one hindered phenol useful in the polymer compositions of the invention comprises one or more compounds selected from triethylene glycol bis[3-(3-t-butyl-5-methyl-4-hydroxyphenyl)propionate], 1,6-hexanediolbis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl) propionate], octadecyl 3-(3,5-di-t-butyl-4-hydroxyphenyl)propionate, benzenepropanoic acid 3,5-bis(1,1-dimethylethyl)-4-hydroxy-2,2-bis[[3-[3,5-bis(1,1-dimethylethyl)-4-hydroxyphenyl]-1-oxopropoxy]methyl]-1,3-propanediyl ester, N,N'-hexamethylene bis(3,5-di-t-butyl-4-hydroxyhydrocinnamamide), tetrakis(methylene 3,5-di-tert-butyl-hydroxycinnamate)methane, 4-[[4,6-bis(octylthio)-1,3,5-triazin-2-yl]amino]-2,6-bis(1,1-dimethylethyl)phenol (Irganox®565), and octadecyl 3,5-di-tert-butylhydroxyhydrocinnamate.

In one embodiment, the phenolic antioxidants useful in the polymer compositions of the invention can be octadecyl-3-(3,5-di-tert.butyl-4-hydroxyphenyl)-propionate (CAS number 2082-79-3; pentaerythritol tetrakis[3-(3,5-di-t-butyl-4-hydroxyphenyl)propionate] (CAS #6683-198, otherwise known as Irganox™ 1010); N,N'-hexane-1,6-diyl-bis [3-(3,5-ditertbutyl-4-hydroxyphenyl]propionamide] (CAS #23128-747-, Irganox™ 1098); benzenepropanoic acid 3,5-bis(1,1-dimethylethyl)-4-hydroxyoctadecyl ester (Irganox™1076). The Irganox phenolic brand of additives can be commercially obtained from BASF). In a further aspect, the hindered phenol comprises octadecyl-3-(3,5-di-t-butyl-4-hydroxyphenyl)-propionate. In an even further aspect, at least one hindered phenol is 3,5-bis(1,1-dimethylethyl)-4-hydroxy-2,2-bis[[3-[3,5-bis(1,1-dimethylethyl)-4-hydroxyphenyl]-1-oxopropoxy]methyl]-1,3-propanediyl ester.

In one embodiment, the phenolic antioxidant is present in the amount of from 0.01 to 5 weight %, or from 0.01 weight % to 4 weight %, or from 0.01 weight % to 3 weight %, or from 0.01 weight % to 2.0 weight %, or from 0.01 weight % to 1.0 weight %, or from 0.01 weight % to 0.90 weight %, or from 0.01 weight % to 0.80 weight %, or from 0.01 weight % to 0.75 weight %, or from 0.01 to 0.70 weight %, or from 0.01 to 0.60 weight %, or from 0.01 weight % to 0.50 weight % or from 0.10 weight % to 5 weight %, or from 0.10 weight % to 4 weight %, or from 0.10 weight % to 3 weight %, or from 0.10 weight % to 2.0 weight %, or from 0.10 weight % to 1.0 weight %, or from 0.10 weight % to 0.90 weight %, or from 0.10 weight % to 0.80 weight %, or from 0.10 weight % to 0.75 weight %, or from 0.10 weight % to 0.70 weight %, or from 0.10 weight % to 0.60 weight %, or from 0.10 weight % to 0.50 weight %, or from 0.25 weight % to 5 weight %, or from 0.25 weight % to 4 weight %, or from 0.25 weight % to 3 weight %, or from 0.25 weight % to 2.0 weight %, or from 0.25 weight % to 1.0 weight %, or from 0.25 weight % to 0.90 weight %, or from 0.25 weight % to 0.80 weight %, or from 0.25 weight % to 0.75 weight %, or from 0.25 weight % to 0.70 weight %, or from 0.25 weight % to 0.60 weight %, or from 0.25 weight % to 0.50 weight %, or from 0.50 weight % to 5 weight %, or from 0.50 weight % to 4 weight %, or from 0.50 weight % to 3 weight %, or from 0.50 weight % to 2.0 weight %, or from 0.50 weight % to 1.5 weight %, or from 0.50 weight % to 1.0 weight %, or from 0.50 weight % to 0.90 weight %, or from 0.50 weight % to 0.80 weight %, or from 0.50 weight % to 0.75 weight %, or from 0.80 weight % to 1.2 weight %, based on the total weight of the polymer composition equaling 100 weight %.

In certain aspects of the invention, the primary antioxidant can be present (total loading) in the polymer compositions of the invention in the amount of from 0.01 weight % to 5 weight % or from 0.01 weight % to 4 weight % or from 0.01 weight to 3 weight % or from 0.01 to 2.0 weight % or from 0.01 to 1.5 or from 0.01 to 1 weight % or from 0.01 to 0.75 weight % or from 0.01 to 0.50 weight % or from or from 0.10 weight % to 5 weight % or from 0.10 weight % to 4 weight % or from 0.10 weight to 3 weight % or from 0.10 to 2.0 weight % or from 0.10 to 1.5 or from 0.10 to 1 weight % or from 0.10 to 0.75 weight % or from 0.10 to 0.60 weight % or from, based on the total weight of the polymer composition equaling 100 weight %.

In certain aspects of the invention, the primary antioxidant can be present (total loading) in the polymer compositions of the invention in the amount of from 0.01 to 2.0 weight %, or from 0.10 to 2.0 weight %, from 0.01 to 1.0 weight %, or from 0.10 to 1.0 weight %, or from 0.10 to 1.5, or from 0.50 to 1.5, or from 0.75 to 1.25, or from 0.10 to 60 weight %, based on the total weight of the polymer composition equaling 100 weight %.

In one aspect of the invention, the primary antioxidant can be present (total loading) in the polymer compositions of the invention in the amount of from 0.01 to 1.0 weight %, 0.01 to 0.90 weight % or from 0.10 to 1.0 weight %, 0.10 to 0.90 weight % from 0.20 to 1.0 weight %, 0.20 to 0.90 weight % from 0.25 to 1.0 weight % or 0.25 to 0.90 weight %, based on the total weight of the polymer composition.

A secondary antioxidant is useful in the present invention. Molecular weight, reactivity and hydrolytic stability can be considered in the choice of secondary antioxidant. Some examples of secondary antioxidants are thiodipropionates, phosphites and metal salts. Thiopropionates are mostly used in polyolefins.

Phosphites are secondary antioxidants useful in one embodiment of this invention.

The secondary antioxidant can be selected from an organophosphate or thioester, or a combination thereof. In a still further aspect, the secondary anti-oxidant comprises one or more compounds selected from tris(nonyl phenyl)phosphite [Weston™399, available from Addivant, Conn.), tetrakis(2,4-di-tert-butylphenyl) [1,1-biphenyl]-4,4'-diylbisphosphonite, tris(2,4-di-tert-butylphenyl)phosphite (Irgafos™168, available from BASF), bis(2,4-di-tert-butylphenyl)pentaerythritol diphosphite, bis(2,4-dicumylphenyl)pentaerythritoldiphosphite, and distearyl pentaerythritol diphosphite.

In one embodiment, the polymer composition of the invention contains at least one phosphite comprising an aryl phosphite or an aryl monophosphite. As used herein, the term "aryl monophosphite" refers to a phosphite stabilizer which contains: (1) one phosphorus atom per molecule; and (2) at least one aryloxide (which may also be referred to as a phenoxide) radical which is bonded to the phosphorus. In one embodiment, the aryl monophosphite contains $C_1$ to $C_{20}$, or $C_1$ to $C_{10}$, or $C_2$-$C_6$ alkyl substituents on at least one of the aryloxide groups. Example of $C_1$ to $C_{20}$ alkyl substituents include but are not limited to methyl, ethyl, n-propyl, isopropyl, n-butyl, sec-butyl and iso-butyl, tertiary butyl, pentyl, hexyl, octyl, nonyl, and decyl. Preferred aryl groups include but are not limited to phenyl and naphthyl.

In one embodiment, the phosphites useful in the invention comprise tertiary butyl substituted aryl phosphites. In another embodiment, the aryl monophosphite comprises at least one of triphenyl phosphite, phenyl dialkyl phosphites, alkyl diphenyl phosphites, tri(nonylphenyl)phosphite, tris-(2,4-di-t-butylphenyl)phosphite, bis(2,4-di-t-butyl-6-methylphenyl)ethyl phosphite, (believed to be Irgafos™38, available from BASF), 2,2,2-nitrilo[triethyltris(3,3,5,5-tetra-tert-butyl-1,1-biphenyl-diyl)phosphite (believed to be Irgafos™12, available from BASF. In another embodiment, the aryl monophosphite is selected from one or more of tris-(2,4-di-t-butylphenyl)phosphite, bis(2,4-di-t-butyl-6-methylphenyl)ethyl phosphite, and 2,2,2-nitrilo[triethyltris(3,3,5,5-tetra-tert-butyl-1,1-biphenyl-diyl)phosphite. In a further embodiment, an aryl monophosphite useful in the invention is tris-(2,4-di-t-butylphenyl)phosphite.

In one embodiment, suitable secondary antioxidant additives include, for example, organic phosphites such as, tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; or combinations comprising at least one of the foregoing antioxidants.

In one aspect, the secondary antioxidant is present in an amount from about 0.01 weight % to about 3.0 weight %, or from 0.01 weight % to 2 weight %, or from 0.01 weight % to 1 weight % or from 0.10 weight % to 5 weight %, or from 0.10 weight % to 4 weight %, or from 0.10 weight % to 3 weight %, or from 0.10 weight % to 2 weight %, or from 0.10 weight % to 1 weight %, or from 0.25 weight % to 1 weight %, or from 0.25 weight % to 0.75 weight %, based on the total weight of the polymer composition.

In a further aspect, the secondary antioxidant is present in an amount from about 0.01 weight % to about 2.5 weight %. In still another aspect, the secondary antioxidant is present in an amount from about 0.5 weight % to about 2.5 weight %. In yet another aspect, the secondary antioxidant is present in an amount from about 0.5 weight % to about 2.0 weight % In still another aspect, the secondary antioxidant is present in an amount from about 0.05 weight % to about 0.75 weight %. In still another aspect, the secondary antioxidant is present in an amount from about 0.05 weight % to about 0.75 weight %. In certain embodiments, the secondary antioxidant is present in an amount from about 0.1 weight % to about 1.0 weight %, or about 0.2 weight % to about 0.8 weight %, or 0.25 to 0.75 weight %. In one embodiment, the secondary antioxidant is present in an amount from about 0.35 weight % to about 0.65 weight %.

In certain aspects of the invention, the weight ratio of primary antioxidant to secondary antioxidant present in the polymer compositions useful in the invention can be from 5:1 to 1:5. In certain aspects of the invention, the weight ratio of primary antioxidant to secondary antioxidant can be 5:1 or 4:1 or 3:1 or 2:1 or 1:1 or 1:2 or 1:3 or 1:4 or 1:5. In certain aspects of the invention, the weight ratio of primary to secondary antioxidant is 1:1 or 1:2 or 1:3 or 1:4 or 1:5. In certain aspects of the invention, the weight ratio of primary antioxidant to secondary antioxidant is 2:1 to 1:2, e.g., 2:1. In certain aspects of the invention, the weight ratio of primary antioxidant to secondary antioxidant is in the range from 1.1:1 to 4:1, or 1.2:1 to 4:1, or 1.5:1 to 4:1, or 1.6:1 to 4:1, or 1.8:1 to 4:1, or 2:1 to 4:1, or 1.1:1 to 3:1, or 1.2:1 to 3:1, or 1.5:1 to 3:1, or 1.6:1 to 3:1, or 1.8:1 to 3:1, or 2:1 to 3:1, 1.1:1 to 2.5:1, or 1.2:1 to 2.5:1, or 1.5:1 to 2.5:1, or 1.6:1 to 2.5:1, or 1.8:1 to 2.5:1, or 2:1 to 2.5:1.

The polymers of the invention can comprise at least one chain extending agent. Suitable chain extending agents include, but are not limited to, multifunctional (including, but not limited to, bifunctional) isocyanates, multifunctional epoxides, including for example, and phenoxy resins. In one embodiment, the chain extending agents have epoxide dependent groups. In one embodiment, the chain extending additive can be one or more styrene-acrylate copolymers with epoxide functionalities. In one embodiment, the chain extending additive can be one or more copolymers of glycidyl methacrylate with styrene.

In certain embodiments, chain extending agents may be added at the end of the polymerization process or after the polymerization process. If added after the polymerization process, chain extending agents can be incorporated by compounding or by addition during conversion processes such as injection molding or extrusion. The amount of chain extending agent used can vary depending on the specific monomer composition used and the physical properties desired but is generally about 0.1 percent by weight to about 10 percent by weight, or from about 0.1 to about 5 percent by weight, based on the total weight of the polymer.

Chain extending additives can also be added during melt processing to build molecular weight through 'reactive extrusion' or 'reactive chain coupling or any other process known in the art.

Chain extending agents useful in the invention can include, but are not limited to, copolymers of glycidyl methacrylate (GMA) with alkenes, copolymers of GMA with alkenes and acrylic esters, copolymers of GMA with alkenes and vinyl acetate, copolymers of GMA and styrene. Suitable alkenes comprise ethylene, propylene, and mixtures of two or more of the foregoing. Suitable acrylic esters comprise alkyl acrylate monomers, including, but not limited to, methyl acrylate, ethyl acrylate, propyl acrylate, butyl acrylate, and combinations of the foregoing alkyl acrylate monomers. When present, the acrylic ester can be used in an amount of 15 weight % to 35 weight %, based on the total amount of monomer used in the copolymer, or in any other range described herein. When present, vinyl acetate can be used in an amount of 4 weight % to 10 weight % based on the total amount of monomer used in the copolymer.

In certain embodiments, the chain extender comprises acrylic esters comprising monomers selected from alkyl acrylate monomers, including, but not limited to, methyl acrylate, ethyl acrylate, propyl acrylate, butyl acrylate, and combinations thereof. In embodiments, the chain extender is a copolymer comprising at least one acrylic ester and styrene.

Illustrative examples of suitable chain extending agents comprise ethylene-glycidyl acrylate copolymers, ethylene-glycidyl methacrylate copolymers, ethylene-glycidyl methacrylate-vinyl acetate copolymers, ethylene-glycidyl methacrylate-alkyl acrylate copolymers, ethylene-glycidyl methacrylate-methyl acrylate copolymers, ethylene-glycidyl methacrylate-ethyl acrylate copolymers, and ethylene-glycidyl methacrylate-butyl acrylate copolymers.

Examples of useful chain extending agents include but are not limited to Joncryl 4368, Joncryl™4468 (copolymers of glycidyl methacrylate with styrene), Joncryl™4368, Joncryl™4470, Joncryl™4370, Joncryl™ 4400, Joncryl™4300, Joncryl™4480, Joncryl™4380, Joncryl™4485, Joncryl™4385, and mixtures thereof commercially available from BASF Corporation, New Jersey.

In one embodiment, the chain extending agents can be styrene-acrylate copolymers with glycidyl groups. In another embodiment, the chain extending agent can be a copolymer of glycidyl methacrylate and styrene.

In one embodiment, the polymeric chain extending agent can have an average of greater than or equal to 2 pendant epoxy groups per molecule, greater than or equal to 3 pendant epoxy groups per molecule; or an average of greater than or equal to 4 pendant epoxy groups per molecule; or an average of greater than or equal to 5 pendant epoxy groups per molecule; or an average of greater than or equal to 6 pendant epoxy groups per molecule; or an average of greater than or equal to 7 pendant epoxy groups per molecule; or more specifically, an average of greater than or equal to 8 pendant epoxy groups per molecule, or, more specifically, an average of greater than or equal to 11 pendant epoxy groups per molecule, or, more specifically, an average of greater than or equal to 15 pendant epoxy groups per molecule, or, more specifically, an average of greater than or equal to 17 pendant epoxy groups per molecule. The lower limits of the number of pendant epoxy groups may be determined by one of ordinary skill in the art to apply to specific manufacturing conditions and/or to particular end-use applications. In certain embodiments, the chain extending agent can have from 2 to 20 pendant epoxy groups per molecule, or from 5 to 20 pendant epoxy groups per molecule, or from 2 to 15 pendant epoxy groups per molecule, or from 2 to 10 pendant epoxy groups per molecule, or from 2 to 8 pendant epoxy groups per molecule, or 3 to 20 pendant epoxy groups per molecule, or from 3 to 15 pendant epoxy groups per molecule, or from 5 to 15 pendant epoxy groups per molecule, or from 3 to 10 pendant epoxy groups per molecule, or from 5 to 10 pendant epoxy groups per molecule, or from 3 to 8 pendant groups per molecule, or from 3 to 7 pendant epoxy groups per molecule.

The composition comprises 0.1 weight % to 20 weight % of polymeric chain extending agent, based on the total weight of the composition. Within this range, the composition can comprise less than or equal to 15 weight %, or, more specifically less than or equal to 10 weight %, or, even more specifically, less than or equal to 8 weight % chain extending agent. Also within this range, the composition may comprise greater than or equal to 0.5 weight %, or greater than or equal to 1 weight %, or greater than or equal to 4 weight % chain extending agent, based on the total weight of the polymer composition equaling 100 weight %.

In certain aspects of the invention, the chain extending agent can be present (total loading) in the polymer composition of the invention in the amount of from 0.01 weight % to 5 weight %, or from 0.01 weight % to 4 weight %, or from 0.01 weight % to 3 weight %, or from 0.01 weight % to 2, weight % or from 0.01 weight % to 1 weight %, or from 0.10 weight % to 5 weight %, or from 0.10 weight % to 4 weight %, or from 0.10 weight % to 3 weight %, or from 0.10 weight % to 2 weight %, or from 0.10 weight to 1.5 weight %, or from 0.10 weight % to 1 weight, or from 0.25 weight % to 5 weight %, or from 0.25 weight % to 4 weight %, or from 0.25 weight % to 3 weight %, or from 0.25 weight % to 2 weight %, or from 0.25 weight to 1.5 weight %, or from 0.25 weight % to 1 weight, or from 0.25 weight % to 0.75 weight %, or from 0.50 weight % to 5 weight %, or from 0.50 weight % to 4 weight %, or from 0.50 weight % to 3 weight %, or from 0.50 weight % to 2 weight %, or from 0.50 weight to 1.5 weight %, or from 0.50 weight to 1.2 weight %, or from 0.50 weight % to 1 weight, based on the total weight of the polymer composition equaling 100 weight %. In certain embodiments, the chain extending agent can be present (total loading) in the polymer composition of the invention in the amount of from 0.25 weight % to 0.75 weight %, or from 0.30 weight % to 0.70 weight %, or from 0.4 weight % to 0.6 weight %.

In certain aspects of the invention, the chain extending agent is present (total loading) in the polymer composition of the invention in the amount of from 0.01 weight % to 1 weight % or from 0.10 weight % to 1 weight % or from based on the total weight of the polymer composition.

The initial amount of the chain extending agent used and order of addition will depend upon the specific chain extending agent chosen and the specific amounts of polyester employed.

In one embodiment, the weight ratio of chain extending agent to primary antioxidant present in the polymer compositions useful in the invention can be from 5:1 to 1:5. In certain aspects of the invention, the weight ratio of chain extending agent to primary antioxidant can be 5:1 or 4:1 or 3:1 or 2:1 or 1:1 or 1:2 or 1:3 or 1:4 or 1:5. In certain aspects of the invention, the weight ratio of chain extending agent to primary antioxidant is 3:1 to 1:2, or 2.5-3:1. In certain aspects of the invention, the weight ratio of chain extending agent to primary antioxidant is 1:2 or 3:1.

In certain aspects of the invention, the weight ratio of chain extending agent to secondary antioxidant present in the polymer compositions useful in the invention can be from 5:1 to 1:5. In certain aspects of the invention, the weight ratio of chain extending agent to secondary antioxidant can be 5:1 or 4:1 or 3:1 or 2:1 or 1:1 or 1:2 or 1:3 or 1:4 or 1:5. In certain aspects of the invention, the weight ratio of chain extending agent to secondary antioxidant is 3:1. In certain aspects of the invention, the weight ratio of chain extending agent to secondary antioxidant is 1:1 or 1.5:1 or 1.3:1. In another embodiment, the weight ratio of chain extending agent to secondary antioxidant is 1:1 to 3:1, or 1:1 to 2:1.

In certain embodiemnts, the polymer composition comprises: (1) at least one hindered phenolic antioxidant that comprises one or more compounds selected from pentaerythritol tetrakis[3-(3,5-di-t-butyl-4-hydroxyphenyl)propionate, octadecyl-3-(3,5-d i-t-butyl-4-hyd roxyphenyl)-propionate, N,N'-hexane-1,6-diyl-bis[3-(3,5-ditert-butyl-4-hydroxyphenyl)propionamide, benzenepropanoic acid 3,5-bis(1,1-dimethylethyl)-4-hydroxyoctadecyl ester, and octadecyl-3-(3,5-di-tert.butyl-4-hydroxyphenyl)-propionate (CAS number 2082); (2) at least one phosphite that is chosen from tris-(2,4-di-t-butylphenyl)phosphite, bis(2,4-di-t-butyl-6-methylphenyl)ethyl phosphite, or 2,2,2-nitrilo[triethyltris(3,3,5,5-tetra-tert-butyl-1,1-biphenyl-diyl)phosphite; and (3) at least one chain extending agent that is a copolymer of glycidyl methacrylate and styrene.

In certain embodiments, the polymer composition comprises at least one hindered phenolic antioxidant that is pentaerythritol tetrakis[3-(3,5-di-t-butyl-4-hydroxyphenyl)propionate; at least one phosphite that is tris(2,4-di-tert-butylphenyl)phosphite; and at least one chain extending agent that is Joncryl™4468 additive.

In one embodiment of the present invention, a primary antioxidant is incorporated in the hindered phenol family, i.e., Irganox™ 1010 commercially available from BASF Corporation, New Jersey, in the amounts of 0.01 to about 2.0% by weight, a secondary antioxidant in the phosphite family, i.e, Irgafos™168 commercially available from BASF Corporation, New Jersey, in the amounts of 0.01 to 2.0% by weight, and a chain extending agent in the styrene-acrylate copolymer family, i.e., Joncryl™4468 commercially available from BASF Corporation, New Jersey, in the amounts from 0.01 to 2.0% by weight into a polyester or copolyester.

In one embodiment, the polymer composition comprises (1) at least one phenolic antioxidant in the amount of from 0.01 weight % to 2.0 weight %, (2) at least one phosphite in the amount of from 0.10 weight % to 1.0 weight %, and (3) said chain extending agent in the amount of from 0.25 weight % to 2.0 weight percent, based on the total weight of the polymer composition.

In one embodiment, the polymer composition comprises (1) at least one phenolic antioxidant in the amount of from 0.10 weight % to 1.5 weight %, or from 0.10 weight % to 1.0 weight %, or from 0.50 weight % to 1.5 weight %, or from 0.75 weight % to 1.25 weight %, (2) at least one phosphite in the amount of from 0.10 weight % to 1.0 weight %, or 0.10 weight % to 0.75 weight %, or from 0.25 weight % to 0.75 weight %, and (3) at least one chain extending agent in the amount of from 0.10 weight % to 1.0 weight %, or 0.25 weight % to 1.0 weight, or from 0.25 weight % to 0.75 weight %.

In one embodiment, the polymer composition comprises (1) at least one phenolic antioxidant in the amount of from 0.75 weight % to 1.25 weight %, (2) at least one phosphite in the amount of 0.10 weight % to 1.0 weight %, or from 0.25 weight % to 0.75 weight %, and (3) at least one chain extending agent in the amount of 0.10 weight % to 1.0 weight %, or from 0.25 weight % to 0.75 weight %.

The weight percentages specified herein can also be combined with the ratios of additives to each other that are specified. They can also be combined with the particular classifications of additives that are described herein. The weight ratios of one additive to another or weight percentages of additives are calculated based on the weight of the additive compared to the total weight of the polymer composition at the time of loading the additive into the composition (total loading) wherein all components equal 100 weight %.

In one embodiment, the stabilizer compositions useful in the invention can improve or maintain color, reduce the loss of number average molecular weight, and/or inherent viscosity, and/or reduce the total number of carboxyl end groups, under the conditions as specified herein.

These combinations of primary antioxidant, secondary antioxidant, and chain extending agent useful in the present invention have been shown herein to be effective in certain polymers, for example polycondensation polymers, e.g. polyester and copolyester classes of polymers. The improved thermal oxidative and hydrolytic stability can be measured by any method known in the art, for example, through using gel-permeation chromatography and through visual color observations, colorimeter, and/or spectrophotometry. Viscosity improvements can be measured by any method known in the art, for example, using parallel plate rheometry or inherent viscosity measures.

Numbers of carboxyl end groups can be measured by titration.

To make stabilized compositions, blends of these antioxidants, chain extending agent and polyesters and copolyesters can either be prepared directly during the polymerization process or compounded to produce pellets using typical plastics compounding and extrusion techniques. These fully compounded or prepared pellets can be processed using convention polymer processing methods, or concentrates of the above additives can be prepared and diluted with neat polyesters and copolyesters, to make sheet, film, injection molded articles, and blow molded articles, using conventional thermoplastic processing methods. To make stabilized compositions, blends of these antioxidants, chain extending agent and polyesters and copolyesters can either be prepared directly during the polymerization process or compounded to produce pellets using typical plastics compounding and extrusion techniques. To make powders that are useful for 3D printing applications or powder coating of metals, the compounded pellets can be subsequently ground and reduced in size at cryogenic temperatures.

In addition, the polymer compositions useful in this invention may also contain at least one other additive selected from colorants, dyes, mold release agents, flame retardants, plasticizers, nucleating agents, other stabilizers (including but not limited to, UV stabilizers, thermal stabilizers, hydrolytic stabilizers), fillers, and impact modifiers. In embodiments, the polymer compositions can contain from 0.01 to 25% by weight or 0.01 to 20% by weight or 0.01 to 15% by weight or 0.01 to 10% by weight or 0.01 to 5% by weight of the total weight of the polymer composition of common additives such as colorants, dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers; functionalized polyolefins, such as those containing methyl acrylate and/or glycidyl methacrylate; styrene-based block copolymer impact modifiers and various acrylic core/shell type impact modifiers. For example, UV additives can be incorporated into articles of manufacture through addition to the bulk, through application of a hard coat, or through coextrusion of a cap layer. Residues of such additives are also contemplated as part of the polymer composition.

Reinforcing materials may be useful in the polymer compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials are glass, such as, fibrous glass filaments, mixtures of glass and talc, glass and mica, and glass and polymeric fibers.

In certain embodiments, the polymer useful in the polymer compositions of this invention can be blended with any other polymer known in the art. For example, the polymer compositions of the invention can comprise at least one polymer chosen from at least one of the following: poly(etherimides), polyphenylene oxides, poly(phenylene oxide)/polystyrene blends, polystyrene resins, polyphenylene sulfides, polyphenylene sulfide/sulfones, poly(estercarbonates), polycarbonates, polysulfones, polysulfone ethers, and poly(ether-ketones).

In some embodiments of the invention, the polymer compositions of the invention and/or the polymer blends of the invention exclude: (1) polycarbonate; (2) bisphenol A polycarbonates; (3) blends of polycarbonate and poly(butylene) terephthalate (PBT); (4) poly(butylene) terephthalate or polyesters containing butanediol; (5) terephthalate based polyesters containing butanediol and bisphenol A polycarbonates; (6) poly(arylene) ethers; (7) cellulose esters; (8) polypropylene; (9) PET homopolymer; (10) carbon nanotubes; and/or (11) polyphosphates.

In one embodiment, certain additional polymers other than the ones described in the polymer compositions of the invention, e.g., polycarbonate, can be present in an amount of 50 weight % or less, or 40 weight % or less, or 30 weight % or less, or 20 weight % or less, or 10 weight % or less, or 5 weight % or less; in another embodiment, 0.01 to 50 weight %, or 1 to 50 weight %, or 5 to 50 weight %, or 0.01 to 40 weight %, or 0.01 to 30 weight % or 0.01 to 20 weight %, or 0.01 to 10 weight % or 0.01 to 5 weight %.

In certain embodiments, the polymer compositions of the invention can comprise a polymer blend of at least one polymer described herein and at least one other polymer. In embodiments, the polymer blend comprises at least one condensation polymer and the stabilizer composition (as described herein) and at least one other polymer selected from liquid crystalline polyesters/amides/imides, polyesteramides, polyimides, polyetherimides, polyurethanes, polyureas, polybenzimidazole, polybenzoxazoles, polyimines, polycarbonates, other polyesters, other copolyesters, and polyamides. In one embodiment, the polymer blend does not include polycarbonate. In one embodiment, the polymer blend does not include bisphenol polycarbonate. In one embodiment, the polymer blend does not include polybutylene terephthalate. In one embodiment, the polymer blend does not include polyarylene ethers. In one embodiment, the polymer blend does not include cellulose esters.

In certain embodiments for the polymer blend, the at least one other polymer is present in the blend in the amount of 50 weight % or less, or 40 weight % or less, or 30 weight % or less, or 20 weight % or less, or 10 weight % or less, or 5 weight % or less, based on the total weight of the blend equaling 100 weight %. In embodiments, the at least one other polymer is present in the polymer blend in the amount of 0.01 to 50 weight %, or 1 to 50 weight %, or 5 to 50 weight %, or 0.01 to 40 weight %, or 0.01 to 30 weight % or 0.01 to 20 weight %, or 0.01 to 10 weight % or 0.01 to 5 weight %, based on the total weight of the blend equaling 100 weight %.

In embodiments, the polymer compositions described herein do not contain carbon nanotubes.

An effective amount of the stabilizing composition can be determined by understanding fitness for use requirements, target properties and/or target criteria for various applications and/or thermoplastic processing conditions and/or when the chosen property is preserved during processing.

For the purposes of this invention, "aging" refers to any standard known to one of ordinary skill in the art, and alternatively, is defined as being heated for at least three hours at 200° C. or as being heated for at least twenty-four hours at 175° C.

In one embodiment, the polymers or polymer blends useful in the invention and/or the polymer compositions of the invention, with or without toners, can have color values L*, a* and b* which can be determined using a Hunter Lab Ultrascan Spectra Colorimeter manufactured by Hunter Associates Lab Inc., Reston, Va. The color determinations are averages of values measured on either pellets, or powders or particles less in size than 300 microns, of the polymers or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate, as determined by the L*a*b* color system measured following ASTM D 6290-98 and ASTM E308-99.

Unless stated otherwise herein, the color values for this application were measured using polymer powder prepared by cryogenic grinding using liquid nitrogen in a jet mill to achieve an average particle size in the range from about 50 to 200 microns. The color was measured by weighing out approximately 50 grams of powdered material and placing it into a 60×15 mm Petri culture dish. The dish was sealed and the color values were determined using a Macbeth Spectrophotometer in reflectance mode, as determined by the L*a*b* color system measured following ASTM D 6290-98 and ASTM E308-99.

In certain embodiments, the initial b* color values and/or Δb* color values for the polymers useful in the invention, with or without the presence of dyes/colorants, can be present in one of the following ranges: −10 to 10; −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2.

The initial b* color value of the polymers tested useful in the invention was measured prior to aging (i.e., heating) (for semi-crystalline polymers/polyesters) but after being heated at 200° C. for 15 minutes (for amorphous polymers/polyesters). The Δb* color value for the polymer compositions useful in the invention is the difference between the initial b* color value and the final b* color value after aging.

The initial b* color values and/or the Δb* color values for the polymers useful in the invention can be present in one of the following ranges: less than 10, or less than 9, or less than 8, or less than 7, or less than 6, or less than 5, or less than 4, or less than 3, or less than 2, or less than 1, according to the L*, a* and b* color system of the CIE (International Commission on Illumination); the Δb* color values for all polymers useful in the invention are measured after being heated for at least three hours at 200° C. or, alternatively, after being heated for at least twenty-four hours at 175° C., according to the L*, a* and b* color system of the CIE (International Commission on Illumination).

In one embodiment, the initial b* color value for the polymers useful in the invention is less than 5 and the Δb* color value is less than 5 of said polymer composition.

In one embodiment, the initial b* color value for the polymers useful in the invention and the Δb* color value of said polymer composition is less than 10, or less than 9, or less than 8, or less than 7, or less than 6, or less than 5, or less than 4, or less than 3, or less than 2, or less than 1.

In one embodiment, the initial color of the polymer itself is white or opaque.

Zero shear viscosity is useful in some applications where fast polymer flow during/after rapid heating of the polymer is important. The zero shear viscosities of the polymer compositions useful in the invention can be in the following ranges: the final polymer has zero shear viscosity of 100 to 1,000,000 poise at 170° C. to 325° C., or at 300° C. to 325° C. Zero shear viscosity, as used herein, is determined by ASTM D4440 at a shear-rate of 1 1/s. The addition of the antioxidants can lower the zero-shear viscosity of the polymers thus improving their ability to flow more readily in certain processes including ones in which they are not subjected to external force to form them into an article.

In embodiments, the polymer composition described herein can have a loss in inherent viscosity of 10% or less, or 9% or less, or 8% or less, or 7% or less, or 6% or less, or 5% or less, or 4% or less, or 3% or less, after being heated either for at least three hours at 200° C. or, alternatively, after being heated for at least twenty-four hours at 175° C.

In one embodiment, the melt viscosities of the polymer useful in the invention can be in the following ranges: a melt viscosity of from about 100 to 1,000,000 poise as measured at 170° C. to 325° C. or at 250° C. to 300° C. at a shear rate of 10 1/s as determined using ASTM D4440.

In one embodiment, the polymer compositions of the invention unpredictably undergo equal to or less than a 10% loss of either number average molecular weight (Mn) or weight average molecular weight (Mw) after being heated for at least three hours at 200° C. when used in combination with the primary antioxidants, the secondary antioxidants, the chain extenders and the polymers useful in the invention. This is especially useful in end-use applications requiring extended heating conditions such as those requiring heating for at least three hours at 200° C. or after being heated for at least twenty-four hours at 175° C.

In one embodiment, the polymer compositions of the invention unpredictably undergo equal to or less than a 10% loss of either number average molecular weight (Mn) or weight average molecular weight (Mw) after being heated for at least three hours at 200° C. or after being heated for at least twenty-four hours at 175° C. when the polymers useful in the invention are used in combination with the primary antioxidants, the secondary antioxidants, and the chain extenders useful in the invention.

In one aspect, the polymer composition(s) of the invention can have a loss in weight average molecular weight (Mw) or number average molecular weight (Mn) of 10% or less, or 9% or less, or 8% or less, or 8% or less, or 7% or less, or 6% or less, or 5% or less, or 4% or less or 3% or less, after being heated for at least three hours at 200° C. or, alternatively, after being heated for at least twenty-four hours at 175° C.

In one aspect, the polymer composition(s) of the invention can have a loss in inherent viscosity, of 10% or less, or 9% or less, or 8% or less, or 8% or less, or 7% or less, or 6% or less, or 5% or less, or 4% or less, or 3% or less, after being heated either for at least three hours at 200° C. or, alternatively, after being heated for at least twenty-four hours at 175° C.

In one aspect, the polymer composition(s) of the invention can have a combination of: (1) a Δb* color value less than 10 or less than 5 according to the L*, a* and b* color system of the CIE (International Commission on Illumination) and (2) a loss in weight average molecular weight (Mw) or number average molecular weight (Mn) of 10% or less, after being heated for at least three hours at 200° C. or, alternatively, after being heated for at least twenty-four hours at 175° C.

In one aspect, the polymer composition(s) of the invention can have a combination of: (1) a Δb* color value less than 10 or less than 5 or less than 3 or less than 2 according to the L*, a* and b* color system of the CIE (International Commission on Illumination) and (2) a loss in inherent viscosity of 10% or less or 5% or less or 3% or less, after being heated for at least three hours at 200° C. or, alternatively, after being heated for at least twenty-four hours at 175° C.

In one embodiment, the average number of carboxyl end groups present on the condensation polymer useful in the invention is 20 or less, or 19 or less, or 18 or less, or 17 or less, or 16 or less, or 15 or less, or 14 or less, or 13 or less, or 12 or less, or 11 or less, or 10 or less, or 9 or less, or 8 or less, or 8 or less, or 7 or less, or 6 or less, or 5 or less, or 4 or less, or 3 or less, after being heated either for at least three hours at 200° C. or, alternatively, after being heated for at least twenty-four hours at 175° C. In one embodiment, the polymer composition(s) of the invention can have said carboxyl end groups numbering 20 or less, 15 or less, 10 or less, 6 or less, 5 or less, or, 3 or less, after being heated either for at least three hours at 200° C. or, alternatively, after being heated for at least twenty-four hours at 175° C.

In one aspect, the polymer composition(s) of the invention can have a combination of: (1) a Δb* color value less than 10 or less than 5 or less than 3 or less than 2 according to the L*, a* and b* color system of the CIE (International Commission on Illumination), (2) a loss in inherent viscosity of 10% or less or 5% or less or 3% or less, and (3) average number of carboxyl end groups of 20 or less, 15 or less, 10 or less, or 6 or less, or 5 or less, after being heated either for at least three hours at 200° C. or, alternatively, after being heated for at least twenty-four hours at 175° C.

In one aspect, the polymer composition(s) of the invention can have a combination of: (1) a Δb* color value less than 10 or less than 5 or less than 3 or less than 2 according to the L*, a* and b* color system of the CIE (International Commission on Illumination), (2) a loss in weight average molecular weight (Mw) or number average molecular weight (Mn) of 10% or less, and (3) a zero shear viscosity of 100 to 1,000,000 poise as measured at 170° C. to 325° C., after being heated for at least three hours at 200° C. or, alternatively, after being heated for at least twenty-four hours at 175° C.

In one aspect, the polymer composition(s) of the invention can have a combination of: (1) a Δb* color value less than 10 or less than 5 or less than 3 or less than 2 according to the L*, a* and b* color system of the CIE (International Commission on Illumination), (2) a loss in inherent viscosity of 10% or less or 5% or less or 3% or less, (3) average number of carboxyl end groups of 20 or less, 15 or less, 10 or less, or 6 or less, or 5 or less, and (4) a melt viscosity of from 100 poise to 1,000,000 poise measured at 170° C. to 325° C., the latter being measured using ASTM Method D4440, after being heated either for at least three hours at 200° C. or, alternatively, after being heated for at least twenty-four hours at 175° C.

For the purposes of this invention, the polymers of the invention can be semicrystalline, or amorphous. Degree of crystallinity is measured herein by differential scanning calorimeter (DSC) using ASTM Method D3418 and is determined by a DSC curve and the difference in the enthalpy of crystallization exotherm and the enthalpy of fusion (melting) endotherm, as illustrated further below, and is reported herein as percent crystallinity.

The degree of crystallization can be determined using a Perkin-Elmer Model DSC-2 differential scanning calorimeter and plotting heat flow versus temperature using a 7.5 mg sample and heating the sample in N2 purge at 20° C./min from RT to 325° C. The degree of crystallization is determined from the plot by calculating the area of the crystallization peak above the steady state heat flow and the area of the melting peak below the steady state heat flow, calculating the difference in areas and dividing by a constant based on the theoretical heat of fusion for 100% crystalline, e.g. for PCTA (29 cal/g). An example of a degree of crystallization calculation is shown in FIG. 1. A review of FIG. 1, reveals that points A and B, and intersect C, was determined by drawing a straight line along the steady state portions of the curve, measuring the area of crystallization peak at 154° C. between points A & C (Hc=3.326 cal/g), measuring the area of melting peak at 225° C. between points B & C (Hf=6.837 cal/g), and calculating the sample by the equation: % crystallinity=(Hf-Hc)/29=(6.837-3.326)/29100%=12.1% crystallinity.

For purposes of this application, an amorphous polymer refers to a polymer having a degree of crystallinity below 1%. For purposes of this application crystalline polymer and semi-crystalline polymer are used interchangeably and refer to a polymer having a degree of crystallinity of 1% or greater. The polymers useful in this invention can have an initial level of crystallinity of from 1% to 100%, where the intial level is measured before being heated. Certain polymers useful in this invention can have a final crystallinity of from 1% to 60%, where the final crystallinity is measured after being heated either for at least three hours at 200° C. or, alternatively, after being heated for at least twenty-four hours at 175° C. In other embodiments, the polymers useful in this invention can have a final crystallinity of from 1 to 40%.

The polymers useful in this invention can have a crystalline melting point of from 165° to 350° C.; from equal to or greater than 280° C.; from equal to or greater than 275° C.; from equal to or greater than 270° C.; from equal to or greater than 255° C.; or from equal to or greater than 250° C.; or from equal to or greater than 200° C., or from equal to or greater than 170° C. as measured by differential scanning calorimetry (DSC) at 20° C./minute according to ASTM Method 3418.

The isothermal crystallization temperature is described, for example, in Elias, H. Macromolecules, Plenum Press: NY, 1977, p 391. The crystallization half-time is determined as the time span from reaching different isothermal crystallization temperatures to the point of a crystallization peak on the DSC curve.

In one aspect, certain polymers useful in the present invention can have crystallization half-times from greater than 0 up to and including 5 minutes. In one aspect, certain polymers useful in the present invention can have crystallization half-times greater than 5 minutes.

In another embodiment, the invention further relates to articles of manufacture comprising any of the polymers and blends described above.

The present invention could have usefulness in multiple applications. Areas that could benefit are applications that are at high temperatures and humidity levels for extended periods of time. These could include applications in the 3D printing of thermoplastic powders, additive printing and/or additive manufacturing, powder coating of metal articles, LED lighting, filtration media, electrical and electronic, under the hood automotive applications, maritime, aerospace, thermoplastic powder coatings and the chemical process industries, surgical simulation devices, and orthotic and prosthetic devices. In certain embodiments, the article of manufacture can comprise at least one light emitting diode (LED) assembly housing, or reflector. In embodiments, the article of manufacture comprises at least one 3D powder or material used to make a different article of manufacture. In embodiments, the article of manufacture is a molded or extruded article.

In embodiments, the article of manufacture is a fiber or a filament. In embodiments, the article of manufacture is a film or sheet Lower shear melt viscosities are very useful for 3-D printing applications where fast polymer flow from the rapid heat up of the polymer from a laser or infrared heat source is helpful to ensuring a well-formed and fused article.

In 3D printing, several processing methods are used which include High Speed Sintering (HSS) and Selective Laser Sintering (SLS). In the case of the HSS process, powdered thermoplastic polymers are heated using an infrared (IR) heat lamp to create useful objects or in the SLS process, a CO2 laser is used to heat the powders. To speed up the printing process, the powders are often held at very high temperatures just below their melting point for up to 24 hours to minimize the heat output from the IR lamp. Polymers held at these high temperatures and times can undergo thermal oxidative degradation and hydrolytic degradation, if they are a condensation polymer. This can cause the molecular weight to drop and the polymer to discolor and render it unrecyclable and un-processable.

Furthermore, in processes such as 3-D printing from powders and traditional powder coating of metals, the ability to flow and create a homogenous article with no other force than gravity or surface tension is helpful in creating useful and aesthetically pleasing articles.

The use of light emitting diodes (LED) has become increasingly common in lighting applications in recent years. LEDs benefit from high efficiency compared to traditional light sources and can be designed to operate for extremely long periods of time. As such, LEDs require materials of construction that can also survive for long periods of time without degrading or losing their efficacy in these applications. Compounded plastic materials are used as reflector materials in the construction of LEDs both to provide control over the direction of emitted light as well as to protect the actual diode from damage. These compounded plastic materials can be thermoplastic or thermoset based on the needs of the LED in the application. For example, high power LEDs, with energy input requires >1.0 watts typically use thermoset materials due to the heat generated in use. Lower wattage LEDs can use thermoplastic materials that can be injection molded. These injection molded materials are cheaper to process and can include a range of conventional materials. During the assembly of LEDs, the diode is soldered to the LEAD frame and this soldering process requires that the thermoplastic materials are dimensionally stable during the soldering process. This requires that material to be semi-crystalline with a crystalline melting point in excess of 280° C. Additionally, since these molded thermoplastic parts reflect the LED light from the diode, they can provide high reflectivity during the lifetime of the application. Low color and high color stability, measured via color measurements as described herein, before and after aging, is often used as a proxy for reflectivity. In certain embodiments, these parts also have high mechanical properties because they protect the diode from damage and survive various processing steps without breaking. The properties of reflectivity and high mechanical strength can be improved by compounding various base resin with other additives. These additives can provide enhanced "whiteness" as is the case for titanium dioxide and they can provide high toughness as is the case for inorganic fillers like glass fiber. Stabilizers and nucleating agents can also be added to improve stability and increase the rate of crystallization respectively. Due to the high demands of the thermoplastic materials in these applications, PCT is currently used in large amounts for the thermoplastic LED applications. PCT has a crystalline melting point of 285° C. and is manufactured carefully to produce a material with very low color (high reflectivity). PCT can be compounded with titanium dioxide and glass fiber along with various stabilizers and additives to optimize the performance of this material in these applications. US Patent Application 2007/0213458 discloses the use of PCT compounds in Light-Emitting Diode Assembly Housings.

During the manufacture of injection molded articles, the thermoplastic resin undergoes thermal and shear induced degradation. Additionally, waste material that is not converted into usable parts should be recycled to reduce to overall cost of the material. For these reasons, the compounded thermoplastic material much be stable to processing without significant loss of the original performance. Additionally, the molded parts should maintain high reflectivity and high mechanical strength throughout the lifetime of the application, which in the case of LEDs, could be as long as 20+ years. This invention describes an optimized combination of additives that improves the process robustness of the compounded PCT resins. Improvements in reflectivity are measured via color and color stability using the color measurement as described herein. Reprocessability is measured via inherent viscosity (IV) before and after an extrusion or processing step.

In another embodiment, the invention further relates to articles of manufacture comprising any of the polymers, polymer compositions or polymer blends described above.

The methods of forming the polymers into articles of manufacture, fibers, films, molded articles, containers, and sheeting are well known in the art. The polyester compositions are useful in articles of manufacture including, but not limited to, fibers, filaments, films, sheets, containers, extruded, calendered, and/or molded articles including, but not limited to, injection molded articles, extruded articles, cast extrusion articles, profile extrusion articles, melt spun articles, thermoformed articles, extrusion molded articles, injection blow molded articles, injection stretch blow molded articles, extrusion blow molded articles and extrusion stretch blow molded articles. The polyester compositions useful in the invention may be used in various types of film and/or sheet, including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting. The polymer compositions and/or polymer blend compositions can be useful in forming fibers, films, light diffusing articles, light diffusing sheets, light reflecting articles, light reflecting sheets, light emitting diodes, 3D powders or other materials, 3D articles containing powders or other materials. The extruded sheet can be further modified using typical fabrication techniques such as thermoforming, cold bending, hot bending, adhesive bonding, cutting, drilling, laser cutting, etc. to create shapes useful for application as light reflectors and/or light diffusers.

In one embodiment, the light reflector article comprising the polymer compositions of the invention can comprise at least one inorganic light reflecting additive, for example, titanium dioxide, barium sulfate, calcium carbonate or mixtures thereof.

Other end-use applications that can employ the polymer compositions of the invention include but are not limited to: (1) membrane backing. It can be a film or a woven or nonwoven (wetlaid or melt blown/melt spun) mat. Improved temperature, chemical resistance, and/or hydrolytic resistance would be relevant to it as well; (2) spun-laid nonwoven webs using processes well known in the art such as meltblowing and spun bond processes, wherein the continuous PCT fiber is spun from a pellet and laid into a nonwoven fabric in a single processing step; dry-laid or wet-laid nonwoven webs using processes well known in the art such as carding or air-laid processes, wherein PCT fiber is first spun in one process, chopped into staple fiber and laid into nonwoven fabric in a secondary step, using dry-laying technologies; Such nonwoven webs can be useful for air and liquid filtration media, particularly those filtration applications which are routinely exposed to high temperatures (80-200 C) or corrosive chemicals. Wet laid webs is a common method for producing filtration media.

Machine clothing comprising monofilament, multifilament fibers, films or sheet, with improved thermal stability over existing PCT, PCT copolymers and additive formulations, to enable use in high temperature manufacturing environments, including for example belts used in the dryer section of paper and tissue making processes. Dry-laid media can include high temperature and/or chemically resistant bag house filters and variation thereof used to capture pollutants, such as those in in coal burning power plants, and various manufacturing processes.

Certain embodiments would include using the polymer compositions of the invention in film application. Film substrates with enhanced stability to high temperature processes and use conditions. High temperature processes may include variations of lead free soldering processes on films requiring good registration, flexibility, and/or optical clarity, as standalone or part of a multilayer system that may include inks, coatings, and/or other functionality.

As used herein, the abbreviation "wt" means "weight". The inherent viscosity of the polymers, for example, the polyesters was determined in 60/40 (wt/wt) phenol/tetrachloroethane at a concentration of 0.5 g/100 ml at 25° C.

The following examples further illustrate how the compositions of matter of the invention can be made and evaluated, and are intended to be purely exemplary of the invention and are not intended to limit the scope thereof. Unless indicated otherwise, parts are parts by weight, temperature is in degrees C. or is at room temperature, loading level is measured in units of weight percentage based on the total weight of the initial polymer composition equaling 100 weight %; and pressure is at or near atmospheric.

It can be clearly seen from a comparison of the data in the above relevant working examples that the combination of the primary antioxidants, secondary antioxidants and chain extending agents useful in the invention within a certain loading level can improved oxidative stability, color and flow of the certain polymers.

The invention has been described in detail with reference to the embodiments disclosed herein, but it will be understood that variations and modifications can be affected within the scope of this invention.

EXAMPLES

The following abbreviations apply throughout the working examples and specification:

Abbreviation Table

| Abbreviation or Term | Description |
|---|---|
| AO | Antioxidant |
| a* | As defined according to the L*, a* and b* color system of the CIE (International Commission on Illumination) |

-continued

Abbreviation Table

| Abbreviation or Term | Description |
|---|---|
| b* | As defined according to the L*, a* and b* color system of the CIE (International Commission on Illumination) |
| Final b* color | b* color value after aging (after being heated for at least three hours at 200° C. or after being heated for at least twenty-four hours at 175° C.). |
| Initial b* or Starting b* | For the data in Tables 1-7, initial b* color value is measured after it is placed in an oven at 200° C. for 15 minutes; For the data in Table 8-14, the initial b* color value of said polymer is measured prior to heating. |
| CEG | Carboxyl end groups were measured via titration |
| da* | Difference in a* |
| db* | Difference in b* |
| De | Total color difference |
| dL* or ΔL* | Difference in L* |
| Delta b* (Δb*); *final b*; *aged b** | Change in b* value = difference between initial b* value and final b*value |
| Design Expert | Statistical software described below |
| Irganox™1010—primary antioxidant | Irganox™1010—pentaerythritol tetrakis[3,5-di-t-butyl-4-hydroxyphenyl)propionate |
| Irgafos™ 168—secondary antioxidant | Irgafos™168—tris(2,4-di-tert-butylphenyl) phosphite |
| Joncryl™ 4468 chain extending agent | Styrene glycidyl-methacrylate |
| Mw | Weight average molecular weight |
| Mn | Number average molecular weight |
| Mz | z-Average Molar Mass; higher average molecular weight (Mz)) |
| PCT | A polyester comprising 100 mole % of 1,4-cyclohexanedimethanol residues, and 100 mole % terephthalic acid residues; poly(cyclohexylenedimethylene) terephthalate (PCT) |
| Polyester 1 | A copolyesterether (PCCE) comprising: 49.5 mole %—1,4-benzenedicarboxylic acid, dimethyl ester, 0.5 mole %—1,3-dihydro-1,2dioxo-5-isobenzofurancarboxylic acid (TMA), 41.1 mole % 1,4-cyclohexanedimethanol, and 8.9 mole % poly(tetramethylene ether) glycol, having an inherent viscosity of 1.16 dUg |
| Polyester 2 | Description is in Table 8; PCT having an inherent viscosity of 0.772 dUg |
| PD | Polydispersity Index (Mw/Mn) |
| IV or I.V. | Inherent viscosity as defined herein |
| dL/g | Deciliters per gram |
| % | Percentages are by weight unless otherwise specified |
| L* | As defined above |
| $R^2$ | Coefficient of determination |
| Adjusted $R^2$ | Modified $R^2$ that is adjusted for the number of predictors in the model. |
| Wt. % | Weight percent as described herein |

Two different types of polymers, an elastomer and a rigid polyester thermoplastic, were evaluated in the present invention and were prepared using two different methods due to the particular processing characteristics of the polymers.

The stabilized elastomer blends were made by using Polyester 1, a PCCE available from Eastman Chemical Company. Pellets of Polyester 1 were pre-dried overnight for at least 4 to 8 hours. Blends of Polyester 1 and stabilizing additives (Irganox™ 1010, Irgafos™ 168, Joncryl™ 4468) were weighed on an analytical scale, mixed together and then added to a Brabender Intelli-Torque batch mixer. A batch size of 260 grams was used, the mixer body was set at 230° C. and the mixer blade rotation speed was set at 40 rpm. Each sample was run until the temperature reached approximately 220° C. The mixer was then stopped and the mixture removed from the mixer. Samples were then cryogenically pulverized into a powder form with particle size less than 300 microns. The powders were then placed in glass jars with the lids removed and put into a forced convection oven set at 170° C. Jars were removed at 1, 2, 4, 8 and 20 hours. Color measurements, both visually and with a spectrophotometer were made, and molecular weight and inherent viscosity were measured using gel permeation chromatography.

The stabilized PCT blends were made by using Polyester 2 or Polyester 3 commercially available from Eastman Chemical Company, Kingsport, Tenn. Samples were pre-dried at 70° C. and then added to a Prism twin screw extruder set at 315° C. The screws were run at 40 rpm. After compounding the blends, 20 grams of pellets were added to shallow aluminum pans and placed in a forced air convection oven set at 200° C. for 15 minutes to crystallize the pellets. These pellets were used to determine the initial color measurement (initial b*). Another 20 grams of pellets were added to shallow aluminum pans and placed in a forced air convection oven set at 200° C. for 3 hours. Molecular weight was measured via gel permeation chromatography, inherent viscosity was measured with a viscometer, and carboxyl end groups were determined via titration.

The following tables and figure summarize experimental results of the invention:

TABLE 1

Polyester 1 with Irganox ™1010 and Irgafos ™168-GPC and Color results—Oven Aging at 170° C.*

| | FORMULATION- | | | FACTORS | | | | | | | | | | |
|---|---|---|---|---|---|---|---|---|---|---|---|---|---|---|
| | (% = weight %) | | | MOLECULAR WEIGHT DATA | | | | COLOR DATA | | | | | | |
| Run Number | Irganox ™ 1010 | Irgafos ™ 168 | Polyester1 | Mn | Mw | Mz | PD | L* | a* | b* | dL* | da* | db* | De |
| 25-1 | 0.000% | 0.000% | 100.000% | | | | | 89.37 | 1.88 | 12.97 | | | | |
| 1 hour | 0.000% | 0.000% | 100.000% | 9961 | 30478 | 58696 | 3.06 | 89.33 | 0.77 | 15.07 | −0.04 | −1.11 | 2.1 | 2.38 |
| 2 hours | 0.000% | 0.000% | 100.000% | 9075 | 27379 | 52635 | 3.017 | 88.55 | −1.01 | 20.6 | −0.82 | −2.89 | 7.63 | 8.2 |
| 4 hours | 0.000% | 0.000% | 100.000% | 2281 | 11875 | 24981 | 5.206 | 94.89 | −0.33 | 11.48 | 5.52 | −2.21 | −1.49 | 6.13 |
| 8 hours | 0.000% | 0.000% | 100.000% | 1238 | 8857 | 35357 | 7.154 | 85.97 | 3.13 | 25.4 | −3.4 | 1.25 | 12.43 | 12.95 |
| 20 hours | 0.000% | 0.000% | 100.000% | 750 | 6439 | 20510 | 8.585 | 76.71 | 7.45 | 29.64 | −12.66 | 5.57 | 16.67 | 21.66 |
| 25-2 | 0.250% | 0.125% | 99.625% | | | | | 88.94 | 2.15 | 15.45 | | | | |
| 1 hour | 0.250% | 0.125% | 99.625% | 11845 | 30358 | 54002 | 2.563 | 90.1 | 1.94 | 14.5 | 1.16 | −0.21 | −0.95 | 1.51 |
| 2 hours | 0.250% | 0.125% | 99.625% | 10388 | 30622 | 60636 | 2.948 | 89.77 | 1.79 | 15.16 | 0.83 | −0.36 | −0.29 | 0.95 |
| 4 hours | 0.250% | 0.125% | 99.625% | 8466 | 28854 | 51929 | 3.408 | 88.81 | 0.85 | 20.07 | −0.13 | −1.3 | 4.62 | 4.8 |
| 8 hours | 0.250% | 0.125% | 99.625% | 7102 | 24388 | 53159 | 3.434 | 85.68 | 1.75 | 26.94 | −3.26 | −0.4 | 11.49 | 11.95 |
| 20 hours | 0.250% | 0.125% | 99.625% | 1640 | 9806 | 29817 | 5.979 | 85.99 | 3.45 | 25.59 | −2.95 | 1.3 | 10.14 | 10.64 |
| 25-3 | 0.500% | 0.250% | 99.250% | | | | | 89.65 | 1.85 | 15.22 | | | | |
| 1 hour | 0.500% | 0.250% | 99.250% | 9615 | 29795 | 53576 | 3.099 | 88.97 | 2.47 | 14.63 | −0.68 | 0.62 | −0.59 | 1.09 |
| 2 hours | 0.500% | 0.250% | 99.250% | 9035 | 30099 | 55150 | 3.331 | 89.14 | 2.51 | 16.12 | −0.51 | 0.66 | 0.9 | 1.23 |
| 4 hours | 0.500% | 0.250% | 99.250% | 9782 | 29923 | 57315 | 3.059 | 86.74 | 3.11 | 20.16 | −2.91 | 1.26 | 4.94 | 5.87 |
| 8 hours | 0.500% | 0.250% | 99.250% | 5814 | 23747 | 40621 | 4.084 | 84.23 | 2.76 | 26.71 | −5.42 | 0.91 | 11.49 | 12.74 |
| 20 hours | 0.500% | 0.250% | 99.250% | 2688 | 11392 | 28166 | 4.238 | 90.5 | 1.28 | 19.34 | 0.85 | −0.57 | 4.12 | 4.25 |
| 25-4 | 1.000% | 0.500% | 98.500% | | | | | 91.04 | 1.76 | 13.74 | | | | |
| 1 hour | 1.000% | 0.500% | 98.500% | 13420 | 29677 | 58886 | 2.211 | 92.21 | 1.5 | 11.92 | 1.17 | −0.26 | −1.82 | 2.18 |
| 2 hours | 1.000% | 0.500% | 98.500% | 12878 | 29951 | 49498 | 2.326 | 91.01 | 2.09 | 13.72 | 0.03 | −0.33 | −0.02 | 0.33 |
| 4 hours | 1.000% | 0.500% | 98.500% | 6070 | 28932 | 53492 | 4.766 | 89.57 | 2.79 | 14.9 | 1.47 | −1.03 | 1.16 | 2.14 |
| 8 hours | 1.000% | 0.500% | 98.500% | 5971 | 29202 | 55726 | 4.891 | 87.82 | 3.2 | 18.86 | 3.22 | −1.44 | 5.12 | 6.22 |
| 20 hours | 1.000% | 0.500% | 98.500% | 6809 | 23417 | 43965 | 3.439 | 82.57 | 4.29 | 30.9 | 8.47 | −2.53 | 17.16 | 19.30 |

*Table 1 shows that a conventional combination of a primary antioxidant (Irganox 1010) and a secondary antioxidant (Irgafos 168), while improving thermal stability to some extent, does not prevent degradation or greatly reduce the change in color.

TABLE 2

Polyester 1 with Irganox 1010 ™, Irgafos ™168 and Joncryl ™4468-GPC and Color results—Oven Aging at 170° C.*

| | FORMULATIONS | | | | FACTORS | | | | | | | | | |
|---|---|---|---|---|---|---|---|---|---|---|---|---|---|---|
| | Irga- | Irga- | | | MOLECULAR WEIGHT DATA | | | | COLOR DATA | | | | | |
| Run Number | nox ™ 1010 | fos ™ 168 | Joncryl ™ 4468 | Poly- ester 1 | Mn | Mw | Mz | PD | L* | a* | b* | dL* | da* | db* | dE |
| 25-5 | 1.000% | 0.500% | 0.600% | 97.900% | 7929 | 35417 | 94202 | 4.467 | 93.2 | −0.49 | 3.99 | | | | |
| 1 hour | 1.000% | 0.500% | 0.600% | 97.900% | 7716 | 35400 | 98674 | 4.588 | | | | | | | |
| 2 hours | 1.000% | 0.500% | 0.600% | 97.900% | 8248 | 36699 | 115745 | 4.449 | | | | | | | |
| 4 hours | 1.000% | 0.500% | 0.600% | 97.900% | 7986 | 36690 | 113414 | 4.594 | | | | | | | |
| 8 hours | 1.000% | 0.500% | 0.600% | 97.900% | 8531 | 39947 | 155293 | 4.683 | | | | | | | |
| 20 hours | 1.000% | 0.500% | 0.600% | 97.900% | 7865 | 46731 | 320096 | 5.942 | 90.29 | −0.73 | 14.15 | −2.91 | −0.25 | 10.16 | 10.57 |
| 25-6 | 1.000% | 0.500% | 1.000% | 97.500% | 7287 | 34627 | 90553 | 4.752 | 93.2 | −0.49 | 3.99 | | | | |
| 1 hour | 1.000% | 0.500% | 1.000% | 97.500% | 7729 | 35405 | 98221 | 4.581 | | | | | | | |
| 2 hours | 1.000% | 0.500% | 1.000% | 97.500% | 7425 | 36003 | 106503 | 4.849 | | | | | | | |
| 4 hours | 1.000% | 0.500% | 1.000% | 97.500% | 7591 | 38281 | 134480 | 5.043 | | | | | | | |
| 8 hours | 1.000% | 0.500% | 1.000% | 97.500% | 7238 | 39405 | 158091 | 5.444 | | | | | | | |
| 20 hours | 1.000% | 0.500% | 1.000% | 97.500% | 7716 | 53043 | 491647 | 6.874 | 92.16 | −0.89 | 10.93 | −1.04 | −0.4 | 6.94 | 7.03 |

TABLE 2-continued

Polyester 1 with Irganox 1010 ™, Irgafos ™168 and Joncryl ™4468-GPC and Color results—Oven Aging at 170° C.*

| | FORMULATIONS | | | | FACTORS | | | | | | | | | | |
|---|---|---|---|---|---|---|---|---|---|---|---|---|---|---|---|
| Run Number | Irganox ™ 1010 | Irgafos ™ 168 | Joncryl ™ 4468 | Polyester 1 | MOLECULAR WEIGHT DATA | | | | COLOR DATA | | | | | | |
| | | | | | Mn | Mw | Mz | PD | L* | a* | b* | dL* | da* | db* | dE |
| 25-7 | 1.000% | 0.500% | 1.400% | 97.100% | 7341 | 34879 | 95374 | 4.751 | 93.2 | −0.49 | 3.99 | | | | |
| 1 hour | 1.000% | 0.500% | 1.400% | 97.100% | 7371 | 35835 | 103906 | 4.862 | | | | | | | |
| 2 hours | 1.000% | 0.500% | 1.400% | 97.100% | 7840 | 36645 | 107961 | 4.674 | | | | | | | |
| 4 hours | 1.000% | 0.500% | 1.400% | 97.100% | 7154 | 41465 | 193510 | 5.796 | | | | | | | |
| 8 hours | 1.000% | 0.500% | 1.400% | 97.100% | 7867 | 43509 | 228978 | 5.531 | | | | | | | |
| 20 hours | 1.000% | 0.500% | 1.400% | 97.100% | 6991 | 52718 | 479743 | 7.541 | 91.9 | −1.13 | 12.63 | −1.3 | −0.64 | 8.64 | 8.76 |

*Table 2 shows that with the incorporation Joncryl 4468 retains molecular weight and greatly reduces the amount of color change.
Mn and Mw either stay the same or increase. The total color change is much less than the readings in Table 1.

TABLE 3

Pilot Plant Scale up—Polyester 1 with Irganox ™1010, Irgafos ™168 and Joncryl ™4468—Color results—24 hours Oven Aging at 175° C.*

| | FORMULATIONS | | | | FACTORS | | | | | | | | | | |
|---|---|---|---|---|---|---|---|---|---|---|---|---|---|---|---|
| | Irganox ™ 1010 | Irgafos ™ 168 | Joncryl ™ 4468 | Polyester 1 | MOLECULAR WEIGHT DATA | | | | COLOR DATA | | | | | | |
| | | | | | Mn | Mw | Mz | PD | L* | a* | b* | dL* | da* | db* | dE |
| No AO | 0% | 0% | 0% | 100.00% | 7707 | 18101 | 31838 | 2.349 | | | | | | | |
| With AO | 1.000% | 0.500% | 0.500% | 98.000% | 14164 | 31126 | 58971 | 2.198 | 92.61 | −0.58 | 9.33 | −0.59 | −0.09 | 5.34 | 5.38 |

*Table 3 shows an optimized formulation that has been compounded on a pilot scaled compounding line and the retention of molecular weight and improved color.

TABLE 4

Polyester 1 with Irganox 1010 ™, Irgafos ™168 and Joncryl ™4468, Zero Shear Viscosity Results.

| TEMPERATURE C | VISCOSITY NO ANTIOXIDANTS (MPA) | VISCOSITY WITH ANTIOXIDANTS (MPA) |
|---|---|---|
| 249.73 | 5105 | 4668.5 |
| 248.82 | 5289.1 | 4789 |
| 247.49 | 5539.4 | 5008.6 |
| 245.17 | 5991.4 | 5271.3 |
| 242.84 | 6443 | 5500.7 |
| 241.45 | 6732.1 | 5817.9 |
| 239.87 | 7088.4 | 6024.1 |
| 238.54 | 7396.4 | 6231.4 |
| 236.93 | 7806.1 | 6459.7 |
| 235.65 | 8119.5 | 6662.1 |
| 234.24 | 8491.7 | 6885.9 |
| 233.14 | 8801.2 | 7130.2 |
| 232.05 | 9106.6 | 7373.1 |
| 230.62 | 9495 | 7602 |
| 228.87 | 10026 | 7846.3 |
| 227.4 | 10454 | 8089 |
| 226.17 | 10841 | 8341.8 |
| 224.96 | 11230 | 8601.4 |
| 223.73 | 11632 | 8865.4 |
| 222.5 | 12038 | 9138.3 |
| 221.28 | 12452 | 9418 |
| 220.06 | 12878 | 9705.6 |
| 218.85 | 13312 | 10050 |
| 217.64 | 13765 | 10417 |
| 216.44 | 14226 | 10748 |
| 215.21 | 14704 | 11074 |
| 213.97 | 15189 | 11414 |
| 212.75 | 15690 | 11759 |
| 211.54 | 16203 | 12115 |
| 210.31 | 16731 | 12485 |
| 208.77 | 17391 | 12867 |
| 207.34 | 18017 | 13262 |
| 206.12 | 18634 | 13662 |
| 204.9 | 19219 | 14082 |
| 203.69 | 19821 | 14510 |
| 202.45 | 20438 | 14954 |
| 201.25 | 21080 | 15424 |
| 199.66 | 21916 | 15898 |
| 198.27 | 22636 | 16385 |
| 197.06 | 23399 | 16892 |
| 195.84 | 24125 | 17415 |
| 194.62 | 24865 | 17960 |
| 193.4 | 25623 | 18517 |
| 192.18 | 26414 | 19094 |
| 190.95 | 27225 | 19700 |
| 189.74 | 28055 | 20323 |
| 188.52 | 28920 | 20951 |
| 187.3 | 29800 | 21627 |
| 186.08 | 30711 | 22313 |
| 184.87 | 31657 | 23028 |
| 183.65 | 32637 | 23765 |
| 182.43 | 33652 | 24533 |
| 181.2 | 34692 | 25328 |
| 179.98 | 35777 | 26173 |
| 178.77 | 36906 | 27056 |
| 177.55 | 38077 | 27991 |

TABLE 4-continued

Polyester 1 with Irganox 1010 ™, Irgafos ™168 and Joncryl ™4468, Zero Shear Viscosity Results.

| TEMPERATURE C | VISCOSITY NO ANTIOXIDANTS (MPA) | VISCOSITY WITH ANTIOXIDANTS (MPA) |
|---|---|---|
| 176.32 | 39309 | 28985 |
| 175.07 | 40555 | 30073 |
| 173.87 | 41876 | 31269 |
| 172.64 | 43277 | 32648 |
| 171.43 | 44740 | 34293 |
| 170.21 | 46306 | 36321 |
| 168.99 | 47972 | 38965 |
| 167.76 | 49772 | 42666 |
| 166.54 | 51724 | 48125 |
| 165.32 | 53899 | 66486 |
| 164.12 | 56383 | 1.22E+06 |
| 162.88 | 59277 | |
| 161.19 | 64002 | |
| 159.4 | 70683 | |
| 158.18 | 77021 | |
| 156.01 | 93850 | |
| 153.98 | 1.21E+05 | |
| 151.95 | 1.77E+05 | |
| 150.3 | 2.70E+05 | |
| 148.71 | 4.44E+05 | |
| 147.37 | 7.03E+05 | |
| 144.8 | 1.91E+06 | |
| 143.65 | 2.96E+06 | |

*Table 4 shows the effect of the anti-oxidant additives on zero shear viscosity, an important attribute in 3-D printing powders where the polymer can flow without any external forces other than gravity and surface tension.

TABLE 5

Polyester 1 with Irganox 1010 ™, Irgafos ™168 and Joncryl ™4468—GPC and Color results—Oven Aging at 170° C.*

| | | Formulations | | | | | | | FACTORS | | | | | | |
|---|---|---|---|---|---|---|---|---|---|---|---|---|---|---|---|
| Run Number | Time | Polyester 1 | Irganox 1010 | Irgafos 168 | Joncryl 4468 | Molecular Weight Data | | | | Color Data | | | | | |
| | | | | | | Mn | Mw | Mz | PD | L* | a* | b* | dL* | da* | db* | DE |
| 1 | 0 hours | 98.500% | 1.000% | 0.000% | 0.500% | 8422 | 34362 | 89987 | 4.08 | 93.52 | −0.49 | 3.93 | | | | |
| | 1 hour | 98.500% | 1.000% | 0.000% | 0.500% | 9713 | 32944 | 68318 | 3.39 | | | | | | | |
| | 2 hours | 98.500% | 1.000% | 0.000% | 0.500% | 7285 | 36745 | 115524 | 5.04 | | | | | | | |
| | 4 hours | 98.500% | 1.000% | 0.000% | 0.500% | 8268 | 38424 | 132133 | 4.65 | | | | | | | |
| | 8 hours | 98.500% | 1.000% | 0.000% | 0.500% | 8542 | 42099 | 188783 | 4.93 | | | | | | | |
| | 20 hours | 98.500% | 1.000% | 0.000% | 0.500% | 8952 | 42145 | 291675 | 4.71 | 84.6 | 2.34 | 27.38 | 2.83 | 23.46 | 25.26 | 27.13 |
| 2 | 0 hours | 98.250% | 1.000% | 0.250% | 0.500% | 8282 | 32148 | 66326 | 3.88 | 93.52 | −0.49 | 3.93 | | | | |
| | 1 hour | 98.250% | 1.000% | 0.250% | 0.500% | 8495 | 35719 | 146409 | 4.2 | | | | | | | |
| | 2 hours | 98.250% | 1.000% | 0.250% | 0.500% | 8447 | 38621 | 175798 | 4.57 | | | | | | | |
| | 4 hours | 98.250% | 1.000% | 0.250% | 0.500% | 9360 | 39949 | 199366 | 4.27 | | | | | | | |
| | 8 hours | 98.250% | 1.000% | 0.250% | 0.500% | 8124 | 43279 | 228716 | 5.33 | | | | | | | |
| | 20 hours | 98.250% | 1.000% | 0.250% | 0.500% | 7820 | 48041 | 371326 | 6.14 | 88.77 | 1.11 | 19.25 | 1.6 | 15.32 | 16.12 | 17.65 |
| 3 | 0 hours | 98.000% | 1.000% | 0.500% | 0.500% | 7091 | 35435 | 165233 | 5 | 93.52 | −0.49 | 3.93 | | | | |
| | 1 hour | 98.000% | 1.000% | 0.500% | 0.500% | 7146 | 38387 | 232072 | 5.37 | | | | | | | |
| | 2 hours | 98.000% | 1.000% | 0.500% | 0.500% | 7624 | 37155 | 191737 | 4.87 | | | | | | | |
| | 4 hours | 98.000% | 1.000% | 0.500% | 0.500% | 7894 | 39416 | 202947 | 4.99 | | | | | | | |
| | 8 hours | 98.000% | 1.000% | 0.500% | 0.500% | 7038 | 44166 | 311159 | 6.28 | | | | | | | |
| | 20 hours | 98.000% | 1.000% | 0.500% | 0.500% | 7261 | 49935 | 414672 | 6.88 | 89.28 | 0.45 | 17.9 | 0.94 | 13.97 | 14.63 | 16.04 |
| 4 | 0 hours | 98.500% | 1.000% | 0.500% | 0.000% | 7142 | 29735 | 75542 | 4.16 | 93.52 | −0.49 | 3.93 | | | | |
| | 1 hour | 98.500% | 1.000% | 0.500% | 0.000% | 6819 | 30875 | 63862 | 4.53 | | | | | | | |
| | 2 hours | 98.500% | 1.000% | 0.500% | 0.000% | 6809 | 31616 | 99208 | 4.64 | | | | | | | |
| | 4 hours | 98.500% | 1.000% | 0.500% | 0.000% | 7192 | 31883 | 90469 | 4.43 | | | | | | | |

TABLE 5-continued

Polyester 1 with Irganox 1010™, Irgafos™168 and Joncryl™4468—GPC
and Color results—Oven Aging at 170° C.*

| | | Formulations | | | FACTORS | | | | | | | | | |
|---|---|---|---|---|---|---|---|---|---|---|---|---|---|---|
| Run Number | Time | Polyester 1 | Irganox 1010 | Irgafos 168 | Joncryl 4468 | Molecular Weight Data | | | | Color Data | | | | | | |
| | | | | | | Mn | Mw | Mz | PD | L* | a* | b* | dL* | da* | db* | DE |
| | 8 hours | 98.500% | 1.000% | 0.500% | 0.000% | 6687 | 31235 | 136411 | 4.67 | | | | | | | |
| | 20 hours | 98.500% | 1.000% | 0.500% | 0.000% | 6894 | 25504 | 88108 | 3.7 | 77.92 | 6.49 | 32.86 | 6.98 | 28.93 | 33.6 | 34.4 |
| 5 | 0 hours | 98.333% | 1.000% | 0.500% | 0.167% | 7563 | 32290 | 77768 | 4.27 | 93.52 | −0.49 | 3.93 | | | | |
| | 1 hour | 98.333% | 1.000% | 0.500% | 0.167% | 7379 | 33829 | 116545 | 4.58 | | | | | | | |
| | 2 hours | 98.333% | 1.000% | 0.500% | 0.167% | 8518 | 37726 | 186898 | 4.43 | | | | | | | |
| | 4 hours | 98.333% | 1.000% | 0.500% | 0.167% | 7359 | 33742 | 123426 | 4.59 | | | | | | | |
| | 8 hours | 98.333% | 1.000% | 0.500% | 0.167% | 7166 | 38621 | 223271 | 5.39 | | | | | | | |
| | 20 hours | 98.333% | 1.000% | 0.500% | 0.167% | 6717 | 33038 | 207690 | 4.92 | 75.78 | 6.42 | 31.38 | 6.91 | 27.46 | 33.41 | 32.91 |
| 6 | 0 hours | 98.167% | 1.000% | 0.500% | 0.333% | 7246 | 33590 | 101821 | 4.64 | 93.52 | −0.49 | 3.93 | | | | |
| | 1 hour | 98.167% | 1.000% | 0.500% | 0.333% | 7169 | 34074 | 106997 | 4.75 | | | | | | | |
| | 2 hours | 98.167% | 1.000% | 0.500% | 0.333% | 6931 | 36213 | 160621 | 5.22 | | | | | | | |
| | 4 hours | 98.167% | 1.000% | 0.500% | 0.333% | 7036 | 37673 | 178436 | 5.35 | | | | | | | |
| | 8 hours | 98.167% | 1.000% | 0.500% | 0.333% | 7090 | 41953 | 261212 | 5.92 | | | | | | | |
| | 20 hours | 98.167% | 1.000% | 0.500% | 0.333% | 7034 | 40691 | 314794 | 5.78 | 86.09 | 2.24 | 24.32 | 2.74 | 20.39 | 21.87 | 23.61 |
| 7 | 0 hours | 99.000% | 0.000% | 0.500% | 0.500% | 8496 | 33621 | 115362 | 3.96 | 93.52 | −0.49 | 3.93 | | | | |
| | 1 hour | 99.000% | 0.000% | 0.500% | 0.500% | 8350 | 35085 | 149612 | 4.2 | | | | | | | |
| | 2 hours | 99.000% | 0.000% | 0.500% | 0.500% | 17830 | 30823 | 49842 | 1.73 | | | | | | | |
| | 4 hours | 99.000% | 0.000% | 0.500% | 0.500% | 7876 | 31466 | 80815 | 4 | | | | | | | |
| | 8 hours | 99.000% | 0.000% | 0.500% | 0.500% | 2324 | 11953 | 49366 | 5.14 | | | | | | | |
| | 20 hours | 99.000% | 0.000% | 0.500% | 0.500% | 1575 | 5528 | 12517 | 3.51 | 47.25 | 13.79 | 21.07 | 46.27 | 14.29 | 17.14 | 51.37 |
| 8 | 0 hours | 98.667% | 0.333% | 0.500% | 0.500% | 7809 | 33029 | 72463 | 4.23 | 93.52 | −0.49 | 3.93 | | | | |
| | 1 hour | 98.667% | 0.333% | 0.500% | 0.500% | 7710 | 33540 | 82371 | 4.35 | | | | | | | |
| | 2 hours | 98.667% | 0.333% | 0.500% | 0.500% | 7778 | 33657 | 84600 | 4.33 | | | | | | | |
| | 4 hours | 98.667% | 0.333% | 0.500% | 0.500% | 8486 | 34485 | 87048 | 4.06 | | | | | | | |
| | 8 hours | 98.667% | 0.333% | 0.500% | 0.500% | 8041 | 36145 | 114886 | 4.49 | | | | | | | |
| | 20 hours | 98.667% | 0.333% | 0.500% | 0.500% | 7123 | 31007 | 134081 | 4.35 | 84.08 | 1.75 | 28.05 | −9.44 | 2.24 | 24.12 | 26 |
| 9 | 0 hours | 98.333% | 0.667% | 0.500% | 0.500% | 7426 | 32825 | 80628 | 4.42 | 93.52 | −0.49 | 3.93 | | | | |
| | 1 hour | 98.333% | 0.667% | 0.500% | 0.500% | 7632 | 34170 | 89394 | 4.48 | | | | | | | |
| | 2 hours | 98.333% | 0.667% | 0.500% | 0.500% | 7734 | 34629 | 98438 | 4.48 | | | | | | | |
| | 4 hours | 98.333% | 0.667% | 0.500% | 0.500% | 8200 | 36356 | 117091 | 4.43 | | | | | | | |
| | 8 hours | 98.333% | 0.667% | 0.500% | 0.500% | 7498 | 38973 | 161177 | 5.2 | | | | | | | |
| | 20 hours | 98.333% | 0.667% | 0.500% | 0.500% | 7676 | 41621 | 242620 | 5.42 | 88.38 | 0 | 18.28 | −5.14 | 0.49 | 14.35 | 15.25 |
| 10 | 0 hours | 99.500% | 0.000% | 0.000% | 0.500% | 9684 | 33737 | 102960 | 3.48 | 93.52 | −0.49 | 3.93 | | | | |
| | 1 hour | 99.500% | 0.000% | 0.000% | 0.500% | 10275 | 34138 | 102992 | 3.32 | | | | | | | |
| | 2 hours | 99.500% | 0.000% | 0.000% | 0.500% | 10037 | 33856 | 131734 | 3.37 | | | | | | | |

TABLE 5-continued

Polyester 1 with Irganox 1010™, Irgafos™168 and Joncryl ™4468—GPC and Color results—Oven Aging at 170° C.*

| Run Number | Time | Formulations | | | | FACTORS | | | | | | | | | | |
|---|---|---|---|---|---|---|---|---|---|---|---|---|---|---|---|---|
| | | Polyester 1 | Irganox 1010 | Irgafos 168 | Joncryl 4468 | Molecular Weight Data | | | | Color Data | | | | | | |
| | | | | | | Mn | Mw | Mz | PD | L* | a* | b* | dL* | da* | db* | DE |
| | 4 hours | 99.500% | 0.000% | 0.000% | 0.500% | 7803 | 27622 | 110068 | 3.54 | | | | | | | |
| | 8 hours | 99.500% | 0.000% | 0.000% | 0.500% | 2562 | 13584 | 73098 | 5.3 | | | | | | | |
| | 20 hours | 99.500% | 0.000% | 0.000% | 0.500% | 1802 | 5793 | 13147 | 3.22 | 43.07 | 10.82 | 14.06 | −50.45 | 11.31 | 10.13 | 52.69 |

*Table 5 shows an interaction between Irganox ™1010 and Joncryl ™4468 to improve molecular weight retention and color, but the addition of IrgafosTm168 reduces the change in color.

Example 1

Table 1 above contains compositions studied, gel permeation chromatography results and color difference data. Four different formulations were investigated, control formulation with 100% Polyester 1, a formulation with 0.25% Irganox 1010, 0.125% Irgafos 168, and 99.625% Polyester 1, a formulation with 0.5% Irganox 1010, 0.25% Irgafos 168, and 99.25% Polyester 1, and a formulation with 1.0% Irganox 1010, 0.5% Irgafos 168, and 98.5% Polyester 1. After the aging protocol in the forced air oven, the results show that molecular weights (number average (Mn), weight average (Mw) and higher average molecular weight (Mz) decreased less with higher loadings of Irganox 1010 and Irgafos 168. Yellowness (b* and db*) and total color difference (dE) all generally changed less with higher loadings of Irganox 1010 and Irgafos 168. There was some difficulty in obtaining accurate color data as some of the powder samples fused together and resulted in some inconsistent measurements, but FIGS. 1 to 5 above (samples 25-1 to 25-4) visually show the dramatic improvement in reducing color change at higher loadings of Irganox 1010 and Irgafos 168.

Example 2

Table 2 above contains compositions studied, gel permeation chromatography results and color difference data. Three different formulations were investigated, a formulation with 1.0% Irganox 1010, 0.5% Irgafos 168, 0.6% Joncryl 4468 and 97.9% Polyester 1, a formulation with 1.0% Irganox 1010, 0.5% Irgafos 168, 1.0% Joncryl 4468 and 97.5% Polyester 1, and a formulation with 1.0% Irganox 1010, 0.5% Irgafos 168, 1.4% Joncryl 4468 and 97.1% Polyester 1. After the aging protocol in the forced air oven, the results show that molecular weights (number average (Mn), weight average (Mw) and higher average molecular weight (Mz)) all increased with higher loadings of Irganox 1010 and Irgafos 168. Only color readings were taken at after 20 hours of oven aging. Yellowness (b* and db*) and total color difference (dE) all generally decreased with higher loadings of Irganox 1010 and Irgafos 168. There was some difficulty in obtaining accurate color data as some of the powder samples fused together and resulted in some inconsistent measurements, but FIGS. 1 to 5 herein (samples 25-5 to 25-7) visually show the dramatic improvement in reducing color change at higher loadings of Irganox 1010, Irgafos 168 and Joncryl 4468. A visual comparison of samples 25-1, 2, 3 and 4 to 25-5, 6 and 7 shows a drastic and unexpected improvement in color.

Example 3

Table 3 above contains the results of a pilot plant scale up including gel permeation chromatography results and color difference data. One formulation was run based on Runs 2 and 3 and consisted of 1.0% Irganox 1010, 0.5% Irgafos 168, 0.5% Joncryl 4468 and 98.0% Polyester 1. A control formulation with no additives was run as a comparison. The composition was compounded on a production size twin screw compounding extruder at 215° C. Extruded strands were immediately cooled in a water bath and then pelletized. Samples were aged in a forced air convection oven set at 175° C. for 24 hours. The GPC data shows that the formulation with Irganox 1010, Irgafos 168 and Joncryl retained molecular weight and had a minimal amount of color change. FIG. 5 visually shows the difference in the two formulations.

Example 4

Table 4 herein shows a viscosity comparison of a formulation of Polyester 1 and a formulation containing 1.0% Irganox™1010, 0.5% Irgafos™ 168, 0.5% Joncryl™ 4468 and 98.0% Polyester 1. A parallel plate rheometer measured viscosity at a sweep rate of 1 rad/sec over a temperature range of approximately 150 to 250° C. A frequency sweep of 1 rad/sec is the lower limit of the equipment and simulates the zero-shear viscosity of a material, that is, the viscosity of the material upon which no shear forces are applied. This is a measure of the resistance to flow of a material. The data shows that the composition containing 1.0% Irganox™ 1010, 0.5% Irgafos™168, 0.5% Joncryl™ 4468 and 98.0% Polyester 1 has a much lower viscosity than the formulation with no additives. This lower viscosity would be desirable is some applications where fast polymer flow during/after rapid heating of the polymer is important.

Example 5

Table 5 herein contains compositions studied, gel permeation chromatography results and color difference data. Ten different formulations were investigated, formulation with combinations of Irganox™1010, Irgafos™168, Joncryl™4468 and Polyester 1 at various loadings. Runs 1, 2, and 3 kept the Irganox™1010 at 1.0%, the Joncryl™4468 at 0.5% and the Irgafos™168 was added at 0.0%, 0.25% and 0.5% to Polyester 1 to a total of 100%. Runs 4, 5, and 6 kept the Irganox™1010 at 1.0%, the Irgafos™168 at 0.5% and the Joncryl™4468 was added at 0.0%, 0.167% and 0.333% to Polyester 1 to a total of 100%. Runs 7, 8, and 9 kept the Irgafos 168 at 0.5%, the Joncryl™4468 at 0.5% and the Irganox™1010 was added at 0.0%, 0.333% and 0.667% to Polyester 1 to a total of 100%. Run 10 only had Joncryl™4468 at 0.5% added to Polyester 1 to a total of 100%. After the aging protocol in the forced air oven, the results show the following: Runs 1, 2 and 3 show that at constant Irganox 1010 and Joncryl™4468 levels, increasing the Irgafos™168 improves molecular weight and overall color difference (DE). Runs 3, 4, 5, and 6 show that at constant Irgnaox™1010 and Irgafos™168, increasing the Joncryl 4468 improves the molecular weight and overall color change (DE). Runs 3, 7, 8 and 9 show that at constant Irgfos™168 and Joncryl™4468, increasing Irganox™1010 dramatically improve the molecular weight and overall color change (DE). The difference between runs 3 and 7 is striking showing that there is a synergy between the Irganox™1010 and the Joncryl™4468. Run 10 shows that Joncryl™4468 on its own has no beneficial effect.

In the following Examples and Tables, the effect of epoxy chain extending agent and antioxidant combinations with poly(cyclohexylenedimethylene) terephthalate (PCT) was studied. An experimental design was completed to understand the effect of these additives on the final material properties of PCT. The design included PCT plus a combination of additives, each added at a high and a low level. It was unexpectedly found that a 2-way interaction exists between the combination of antioxidant and chain extending agent. In other words, the combination of chain extending agent and antioxidant gave significant improvements over the addition of either on their own. Additionally, an optimized formulation that included a secondary antioxidant was identified to maintain IV, reduce carboxyl chain ends, and reduce color in the compound. This optimized formulation contained a low concentration of primary antioxidant, a relatively high level of secondary antioxidant, and a relatively high level of chain extending agent.

Characterization of Polyester 2 prior to processing is shown in Table 6. The additives were melt-blended with PCT in a Prism twin screw extruder. The resulting material was extruded into a strand and then pelletized prior to evaluation. The pelletized material was then tested for color, inherent viscosity, and CEG. After aging in a forced air oven for 3 h at 200° C., the pellets were tested again to measure the aged properties. The color of the pellets was measured using a CieLAB colorimeter and the color was tracked with the b* value.

TABLE 6

Properties of PCT base materials

| Run Number | Sample | IV | Carboxyl End Groups | initial b* |
|---|---|---|---|---|
| 1 | Polyester 2 | 0.772 | 15.6 | 4.0 |

The weight percentages of components of the compositions used in the experimental design is listed in Table 7. A control material (Run #1) was made where the Polyester 2 was passed thru the extruder with no additives to show the effect of ageing on PCT with no stabilizer added. The results from evaluation of the different blends are shown in Table 8.

TABLE 7

Polyester 2 with Irganox 1010 ™, Irgafos 168 ™ and Joncryl 4468 ™

COMPOSITIONS (WEIGHT %)

| Run Number | Irganox 1010 ™ | Irgafos 168 ™ | Joncryl 4468 ™ | Polyester 2 |
|---|---|---|---|---|
| 1 | 0.00 | 0.00 | 0.00 | 100.00 |
| 2 | 0.63 | 0.38 | 0.50 | 98.49 |
| 3 | 0.25 | 0.50 | 0.75 | 98.50 |
| 4 | 0.25 | 0.50 | 0.25 | 99.00 |
| 5 | 0.25 | 0.25 | 0.75 | 98.75 |
| 6 | 1.00 | 0.25 | 0.25 | 98.50 |
| 7 | 1.00 | 0.50 | 0.25 | 98.25 |
| 8 | 1.00 | 0.25 | 0.75 | 98.00 |
| 9 | 0.25 | 0.25 | 0.25 | 99.25 |
| 10 | 0.63 | 0.38 | 0.50 | 98.49 |
| 11 | 1.00 | 0.50 | 0.75 | 97.75 |
| 12 | 0.63 | 0.38 | 0.50 | 98.49 |

TABLE 8

Polyester 2 with Irganox 1010 ™, Irgafos 168 ™ and Joncryl 4468 ™—GPC, Inherent Viscosity and Carboxyl End Groups—Oven Aging at 200° C. for 3 hours
Responses

| Run Number | Mn | Mw | Mz | PD | IV | CarboxylEnd Groups (CEG) | INITIAL b* | FINAL b* | Delta b* |
|---|---|---|---|---|---|---|---|---|---|
| 1 | 10032 | 20589 | 35417 | 2.052 | 0.714 | 24.37 | 6.76 | 12.38 | 5.62 |
| 2 | 10991 | 33864 | 134160 | 3.081 | 0.847 | 11.47 | 3.50 | 6.94 | 3.44 |
| 3 | 11015 | 34897 | 137446 | 3.168 | 0.914 | 6.59 | 1.69 | 3.21 | 1.52 |
| 4 | 10620 | 26814 | 78979 | 2.525 | 0.784 | 15.09 | 2.91 | 5.53 | 2.62 |
| 5 | 10824 | 33581 | 129184 | 3.102 | 0.908 | 9.03 | 1.87 | 4.27 | 2.40 |
| 6 | 10730 | 26171 | 73727 | 2.439 | 0.762 | 17.23 | 6.26 | 10.13 | 3.87 |
| 7 | 10638 | 28144 | 88882 | 2.646 | 0.757 | 15.81 | 6.68 | 10.93 | 4.25 |
| 8 | 11241 | 35473 | 136575 | 3.156 | 0.934 | 5.98 | 4.03 | 5.78 | 1.75 |
| 9 | 10815 | 26587 | 78361 | 2.458 | 0.776 | 15.58 | 3.17 | 4.72 | 1.55 |
| 10 | 11161 | 33821 | 133966 | 3.030 | 0.860 | 10.50 | 3.17 | 5.34 | 2.17 |
| 11 | 11390 | 36010 | 142339 | 3.162 | 0.949 | 5.73 | 2.26 | 3.88 | 1.62 |
| 12 | 11214 | 33945 | 133949 | 3.027 | 0.857 | 10.66 | 3.09 | 5.49 | 2.40 |

The results from testing the compositions (Table 8) defined in the experimental design were analyzed using a statistical software tool. The software was able to analyze experimental data and to assess the magnitude of the response provided by each additive, create models, and to describe the precision by which the models were able to analyze how changes in composition would affect the responses. Additionally, the software is able to confirm the optimal combination of additives that would provide the best performance during aging. A summary of the analysis is shown in Table 4. The statistical software used was DESIGN EXPERT™ 8 software that is commercially available under the name Design Expert by Stat Ease Inc., Hennepin Square, Suite 191, 2021 East Hennepin Avenue, Minneapolis, Minn. 55413-2723 U.S.A. However, it is believed that other commercially available statistical software could also be used.

TABLE 9

Summarized results

| Response | Individual contributions | | | Interactions | | | |
|---|---|---|---|---|---|---|---|
| | Irganox ™ 1010 | Irgafos ™ 168 | Joncryl ™ 4468 | Irganox ™* Irgafos ™ | Irganox ™* Joncryl ™ | Irgafos ™* Joncryl ™ | $R^2$ |
| IV | | | + | | + | | 0.99 |
| CEG | | − | − | | − | | 0.94 |
| Initial b* | + | | − | | − | | 0.89 |
| Aged b* | + | | + | | − | − | 0.94 |

For IV,
+ effect is desired;
For CEG,
− effect is desired, for initial and aged b*, − effect is desired.

Models for each response were created by using Design Expert. The models evaluate how a specific response from the selected target criteria properties is affected by the individual components in each polymer composition using the experimental data. In the case of IV, the response of IV can be predicted with the following equation:

For FIG. 7:

$$IV=0.73-0.06*[Irganox™\ 1010]+0.23*[Joncryl™\ 4468]+0.14*[Irganox™1010]*[Joncryl\ 4468]$$

$R^2=0.99$; $R^2_{adj}=0.99$; $R^2_{pred}=0.98$

The equation shows that the response of IV is directly impacted by the concentrations of primary antioxidant and chain extender individually, but is also affected by the interaction of primary antioxidant and chain extender. The correlation coefficients ($R^2$) are very high for this response.

In the case of carboxyl chain ends (CEG), the response of CEG can be analyzed with the following equation:

For FIG. 8:

$$CEG=19.8+3.7*[Irganox™1010]-4.6*[Irgafos™168]-13.0*[Joncryl™\ 4468]-8.4*[Irganox\ 1010]*[Joncryl\ 4468]$$

$R^2=0.99$; $R^2_{adj}=0.98$; $R^2_{pred}=0.94$

The response of CEG is directly impacted by the concentrations of primary antioxidant, secondary antioxidant, and chain extender individually, but is also affected by the interaction of primary antioxidant and chain extender. The correlation coefficients ($R^2$) are very high for this response.

In the case of initial b* color (b*o), the response of b*o can be analyzed with the following equation:

For FIG. 9:

$$b*_0=2.1+5.91*[Irganox™\ 1010]-1.1*[Joncryl™4468]-5.51*[Irganox™1010]*[Joncryl™4468]$$

$R^2=0.92$; $R^2_{adj}=0.89$; $R^2_{pred}=0.75$

The response of $b*_0$ is thus directly impacted by the concentrations of primary antioxidant and chain extender individually, but is also affected by the interaction of primary antioxidant and chain extender. The correlation coefficients ($R^2$) are very high for this response.

In the case of final or aged b* color ($b*_f$), the response of $b*_f$ can be analyzed with the following equation:

For FIG. 10:

$$b*_f=0.34+10.1*[Irganox™\ 1010]+7.8*[Irgafos™\ 168]+7.0*[Joncryl™4468]-11.5*[Irganox™1010]*[Joncryl™4468]-18.3*[Irgafos™168]*[Joncryl™|b\ 4468]$$

$R^2=0.97$; $R^2_{adj}=0.94$; $R^2_{pred}=0.93$

The response of $b*_f$ is directly impacted by the concentrations of primary antioxidant, secondary antioxidant, and chain extender individually, but is also affected by the interaction of primary antioxidant and chain extender and by the interaction of secondary antioxidant and chain extender. The correlation coefficients ($R^2$) are very high for this response.

Since one of the benefits of this invention is to achieve optimal thermal stability of the polyester, the overall composition can be optimized to provide the most stable range of compositions. The Design Expert software can be used to help evaluate optimal ranges by using a Desirability Function. Desirability is an objective function that ranges from zero outside of the limits to one at the goal. The numerical optimization establishes a point that maximizes the desirability function. The characteristics of a goal may be altered by adjusting the weight or importance based upon selected overall target criteria.

For several responses and factors, all goals were combined into one desirability function. Myers and Montgomery (Response Surface Methodology, p. 244) describe a multiple response method called desirability. The method makes use of an objective function, D(X), called the desirability function. It reflects the desirable ranges for each response (di). The desirable ranges are from zero to one (least to most desirable, respectively). The simultaneous objective function is a geometric mean of all transformed responses:

$$D = (d_1 \times d_2 \times \ldots \times d_n)^{\frac{1}{n}} = \left(\prod_{i=1}^{n} d_i\right)^{\frac{1}{n}}$$

where n is the number of responses in the measure. If any of the responses or factors fall outside their desirability range, the overall function becomes zero.

For certain polymers of this invention, the Desired Composition was selected using the following criteria:
1. Stable or unchanging IV (or molecular weight)
2. Low CEG
3. Low initial b*
4. Low aged b*

Based on these criteria, Design Expert determined the desirability which is shown in the contour plot of FIG. 11: Optimized composition (Irganox™ 1010=0.25%, Irgafos™ 168=0.50%, Joncryl™ 4468=0.65%, desirability=0.757).

These contour plots provide a range of compositions based on data input into the software from the compositions previously tested to meet the target criteria. Another way to evaluate the invention is with a contour overlay plot. In a contour overlay plot, the range of properties achieved as specific parts of the composition, changes can be seen. Contour overlay plots are shown in FIGS. 12 and 13 herein.

From this analysis, a few conclusions can be made: (1) the accuracy (measured with adjusted $R^2$) for this experiment is very good; (2) there is a strong interaction between the Joncryl™ additive and the Irganox™ additive across all responses; (3) For IV and CEG responses, high IV and low CEG are achieved when Joncryl™4468 concentration is high and the Irganox™1010 concentration is high; (4) for color aging, the lowest b* was obtained for initial b* and aged b* measurements when the amount of chain extending agent, Joncryl™4468 additive, was high and when the amount of secondary antioxidant, Irganox 1010™ additive, was low. and (5) there is a significant interaction between the described Joncryl™ and Irganox™ additives for IV and CEG, but even more pronounced with color and color stability.

The target criteria list of properties was established to create a combination of additives that reduce color and color development while maintaining mechanical properties using inherent viscosity as a proxy. Based on these targets and the results from the DOE, an optimized formulation was calculated (based on the selected target criteria) (Table 10):

TABLE 10

Optimized Formulation of Additives to reduce
CEG and b* and increase IV

| Additive | Composition |
| --- | --- |
| Joncryl ™ 4468 | 0.65% |
| Irganox ™1010 | 0.25% |
| Irgafos ™168 | 0.50% |

Comparative Example #1 (Polyester 2)

A sample composition was made using different chain extender and different secondary antioxidant. The composition is shown below. Testing of the resulting material showed very high CEG and very high b* compared with a similar composition described by the invention. Araldite ECN 1299 (CAS#29690-82-2) is an epoxy novolac resin made by Huntsman Advanced Materials, in The Woodlands, Tex.; Ultranox 626, (CAS #26741-53-7), is a bis (2,4-di-t-butylphenyl) pentaerythritol diphosphate made by Addivant, Danbury, Conn.

| Irganox ™ 1010 | Ultranox ™ 626 | Araldite ™ ECN 1299 | Polyester #2 | IV | CEG | Initial b* |
| --- | --- | --- | --- | --- | --- | --- |
| 0.5% | 0.5% | 0.5% | 98.5% | 0.73 | 19.5 | 21.7 |

It can be clearly seen from a comparison of the data in the above relevant working examples that a combination of primary antioxidant, secondary antioxidant and chain extending agent useful in the invention can improve thermal oxidative stability, color and/or flow of certain polymers.

The invention has been described in detail with reference to the embodiments described herein, but it will be understood that variations and modifications can be affected within the scope of the invention.

We claim:
1. A polymer composition comprising:
    (A) at least one condensation polymer comprising at least one diol residue, and
    (B) a stabilizer composition comprising:
        (1) at least one primary antioxidant comprising at least one phenolic antioxidant; and
        (2) at least one secondary antioxidant comprising at least one phosphite, and
        (3) at least one chain extending agent;
    wherein the at least one chain extending agent is selected from copolymers of glycidyl methacrylate with alkenes, copolymers of glycidyl methacrylate with alkenes and acrylic esters, copolymers of glycidyl methacrylate with alkenes and vinyl acetate, copolymers of glycidyl methacrylate and styrene, and wherein the at least one chain extending agent has an average of greater than or equal to 3 pendant epoxy groups per molecule;
    wherein the weight ratio of chain extending agent to primary antioxidant is from 1:1 to 1:4; and
    wherein the Δb* value for said polymer composition is less than 10 according to the L*, a* and b* color system of the CIE (International Commission on Illumination) after being heated for at least three hours at 200° C. or after being heated for at least twenty-four hours at 175° C.

2. The polymer composition according to claim 1, wherein the at least one diol residue comprises 1,4-cyclohexanedimethanol (CHDM) residues.

3. The polymer composition according to claim 1, wherein the at least one primary antioxidant is a hindered phenolic antioxidant.

4. The polymer composition according to claim 3, wherein at least one hindered phenolic antioxidant is pentaerythritol tetrakis[3-(3,5-di-t-butyl-4-hydroxyphenyl)propionate.

5. The polymer composition according to claim 1, wherein the phenolic antioxidant is present in an amount from 0.10 to 2.0 weight %, based on the total weight of the polymer composition equaling 100 weight %.

6. The polymer composition according to claim 1, wherein the at least one phosphite antioxidant is tris(2,4-di-tert-butylphenyl)phosphite.

7. The polymer composition according to claim 1, wherein the phosphite antioxidant is present in an amount from 0.10 weight % to 1 weight %, based on the total weight of the polymer composition.

8. The polymer composition according to claim 1, wherein the weight ratio of phenolic antioxidant (1) to phosphite antioxidant (2) is from 1.1:1 to 3:1.

9. The polymer composition according to claim 1, wherein the at least one chain extending agent has an average of 3 to 20 pendant epoxy groups per molecule.

10. The polymer composition according to claim 1, wherein the chain extending agent comprises a copolymer of glycidyl methacrylate with styrene.

11. The polymer composition according to claim 1, wherein the at least one chain extending agent is present in an amount from 0.10 weight % to 1 weight %, based on the total weight of the polymer composition.

12. The polymer composition according to claim 1, wherein the weight ratio of chain extending agent to primary antioxidant is from 1:1.1 to 1:3.

13. The polymer composition according to claim 1, wherein the polymer composition has an inherent viscosity in the range from 0.35 to 1.0 dL/g, as determined in 60/40 (wt/wt) phenol/ tetrachloroethane at a concentration of 0.5 g/100 ml at 25° C.

14. The polymer composition according to claim 1, wherein the at least one phenolic antioxidant is pentaerythritol tetrakis[3-(3,5-di-t-butyl-4-hydroxyphenyl)propionate, the at least one phosphite is tris(2,4-di-tert-butylphenyl) phosphite, and the at least one chain extending agent is at least one copolymer of glycidyl methacrylate with styrene that has an average of 5 to 20 pendant epoxy groups per molecule.

15. The polymer composition according to claim 1, wherein the polymer composition comprise: (1) at least one phenolic antioxidant in the amount of from 0.01 weight % to 2.0 weight %, (2) at least one phosphite in the amount of from 0.01 weight % to 2.0 weight %, and (3) at least one chain extending agent in the amount of from 0.01 weight % to 2.0 weight percent, based on the total weight of the polymer composition.

16. The polymer composition according to claim 1, wherein the condensation polymer is amorphous.

17. The polymer composition according to claim 1, wherein the condensation polymer is a polyester comprising at least one dicarboxylic acid or an ester thereof and at least one diol, wherein the total of acid residues present is 100 mole % and wherein the total of diol residues present is 100 mole %, wherein the dicarboxylic acid or ester thereof component comprises residues of 1,4-cyclohexanedicarboxylic acid or an ester thereof, and wherein the diol component comprises residues of 1,4-cyclohexanedimethanol and polytetramethylene ether glycol.

18. The polymer composition according to claim 1, wherein the polymer is selected from at least one polyester comprising:
    (a) diacid residues comprising from about 70 to about 100 mole percent of terephthalic acid (TPA) residues and 0 to about 30 mole percent isophthalic acid (IPA) residues; and
    (b) diol residues comprising from about 20 to about 100 mole percent of 1,4-cyclohexanedimethanol (CHDM) residues and 0 to 100 mole percent of ethylene glycol;
    wherein the total of diacid residues is 100 mole % and wherein the total of diol residues is 100 mole %.

19. The polymer composition according to claim 1, wherein the polymer is a copolyesterether.

20. The polymer composition according to claim 17, having an inherent viscosity of from about 0.7 to about 1.5 dL/g, as determined in 60/40 (wt/wt) phenol/ tetrachloroethane at a concentration of 0.5 g/100 ml at 25° C., and comprising:
    A. a dicarboxylic acid component consisting essentially of 1,4-cyclohexanedicarboxylic acid,
    B. a glycol component consisting essentially of
        (1) 1,4-cyclohexanedimethanol, and
        (2) from about 15 to about 50 weight percent, or from 20 to 35 weight percent, based on the weight of the polyesterether, of polytetramethyleneether glycol having a weight molecular weight of about 500 to about 2000.

* * * * *